United States Patent
Kawabata et al.

(10) Patent No.: US 11,298,818 B2
(45) Date of Patent: Apr. 12, 2022

(54) GRIPPING SYSTEM

(71) Applicant: THK CO., LTD., Tokyo (JP)

(72) Inventors: Shinji Kawabata, Tokyo (JP); Yoshikazu Matsuo, Tokyo (JP); Yuki Nomura, Tokyo (JP); Toshiya Watanabe, Tokyo (JP)

(73) Assignee: THK CO., LTD., Tokyo (JP)

( * ) Notice: Subject to any disclaimer, the term of this patent is extended or adjusted under 35 U.S.C. 154(b) by 268 days.

(21) Appl. No.: 16/612,514

(22) PCT Filed: May 15, 2018

(86) PCT No.: PCT/JP2018/018818
§ 371 (c)(1),
(2) Date: Nov. 11, 2019

(87) PCT Pub. No.: WO2018/212203
PCT Pub. Date: Nov. 22, 2018

(65) Prior Publication Data
US 2020/0114508 A1 Apr. 16, 2020

(30) Foreign Application Priority Data

May 15, 2017 (JP) .............................. JP2017-096831
Sep. 19, 2017 (JP) .............................. JP2017-179397

(51) Int. Cl.
*B25J 9/16* (2006.01)
*B25J 15/00* (2006.01)

(52) U.S. Cl.
CPC ......... *B25J 9/1612* (2013.01); *B25J 15/0009* (2013.01)

(58) Field of Classification Search
CPC ...... B25J 9/1612; B25J 15/0009; B25J 15/10; B25J 9/1602; B25J 15/0014;
(Continued)

(56) References Cited

U.S. PATENT DOCUMENTS 8,644,986 B2 * 2/2014 Tsuboi ................. G05B 13/021
   700/245
9,687,982 B1 * 6/2017 Jules ........................ B25J 9/161
(Continued)

FOREIGN PATENT DOCUMENTS

JP        9-323281 A    12/1997
JP     2008-149444 A     7/2008
(Continued)

OTHER PUBLICATIONS

JP2009125879.Translate (Year: 2014).*
(Continued)

*Primary Examiner* — B M M Hannan
(74) *Attorney, Agent, or Firm* — Westerman, Hattori, Daniels & Adrian, LLP

(57) ABSTRACT

A gripping system for gripping an object using a hand mechanism having at least two finger portions includes a specification unit that specifies a contactable portion and an unexposed portion, the contactable portion being a portion of the object that can be contacted by at least a first finger portion constituting one of the finger portions and the unexposed portion being a portion that is not exposed at the time of the determination, a first operation control unit that exposes the unexposed portion of the object, and a second operation control unit that grips the object in a state where the unexposed portion is exposed by bringing the first finger portion or the second finger portion into contact with the unexposed portion and bringing a finger portion other than the finger portion contacting the unexposed portion into contact with a predetermined surface of the object other than the unexposed portion.

11 Claims, 34 Drawing Sheets

(58) Field of Classification Search
CPC .................. B25J 15/0023; B25J 15/0028;
                      B25J 15/0033; B25J 15/0038
USPC ........................................................ 700/247
See application file for complete search history.

(56) References Cited

U.S. PATENT DOCUMENTS

| | | | |
|---|---|---|---|
| 9,914,214 B1* | 3/2018 | Strauss | B25J 15/12 |
| 2008/0114491 A1* | 5/2008 | Takahashi | B25J 13/082 |
| | | | 700/245 |
| 2009/0025502 A1* | 1/2009 | Nakamoto | B25J 15/0009 |
| | | | 74/490.01 |
| 2010/0010670 A1 | 1/2010 | Matsukuma et al. | |
| 2010/0161130 A1* | 6/2010 | Kim | B25J 9/1612 |
| | | | 700/261 |
| 2011/0192247 A1 | 8/2011 | Matsukuma et al. | |
| 2013/0054030 A1* | 2/2013 | Murakami | B25J 9/1697 |
| | | | 700/259 |
| 2013/0158710 A1 | 6/2013 | Oda | |
| 2013/0325181 A1* | 12/2013 | Moore | B25J 13/08 |
| | | | 700/259 |
| 2014/0017048 A1* | 1/2014 | Mattern | B65G 47/1478 |
| | | | 414/567 |
| 2014/0025197 A1* | 1/2014 | Mattern | B25J 13/08 |
| | | | 700/218 |
| 2014/0154036 A1* | 6/2014 | Mattern | B25J 9/0084 |
| | | | 414/729 |
| 2015/0342818 A1* | 12/2015 | Ikebe | A61H 1/0288 |
| | | | 601/40 |
| 2015/0343634 A1* | 12/2015 | Kiyosawa | B25J 15/0253 |
| | | | 700/228 |
| 2018/0311828 A1* | 11/2018 | Paavilainen | B25J 15/0033 |

FOREIGN PATENT DOCUMENTS

| | | |
|---|---|---|
| JP | 2009-125879 A | 6/2009 |
| JP | 2013-126706 A | 6/2013 |
| JP | 5525587 B2 | 6/2014 |
| JP | 2015-533669 A | 11/2015 |
| WO | 2014/074840 A1 | 5/2014 |

OTHER PUBLICATIONS

International Search Report dated Aug. 7, 2018, issued in counterpart International Application No. PCT/JP2018/018818, w/English translation (4 pages).

* cited by examiner

[Fig. 1]
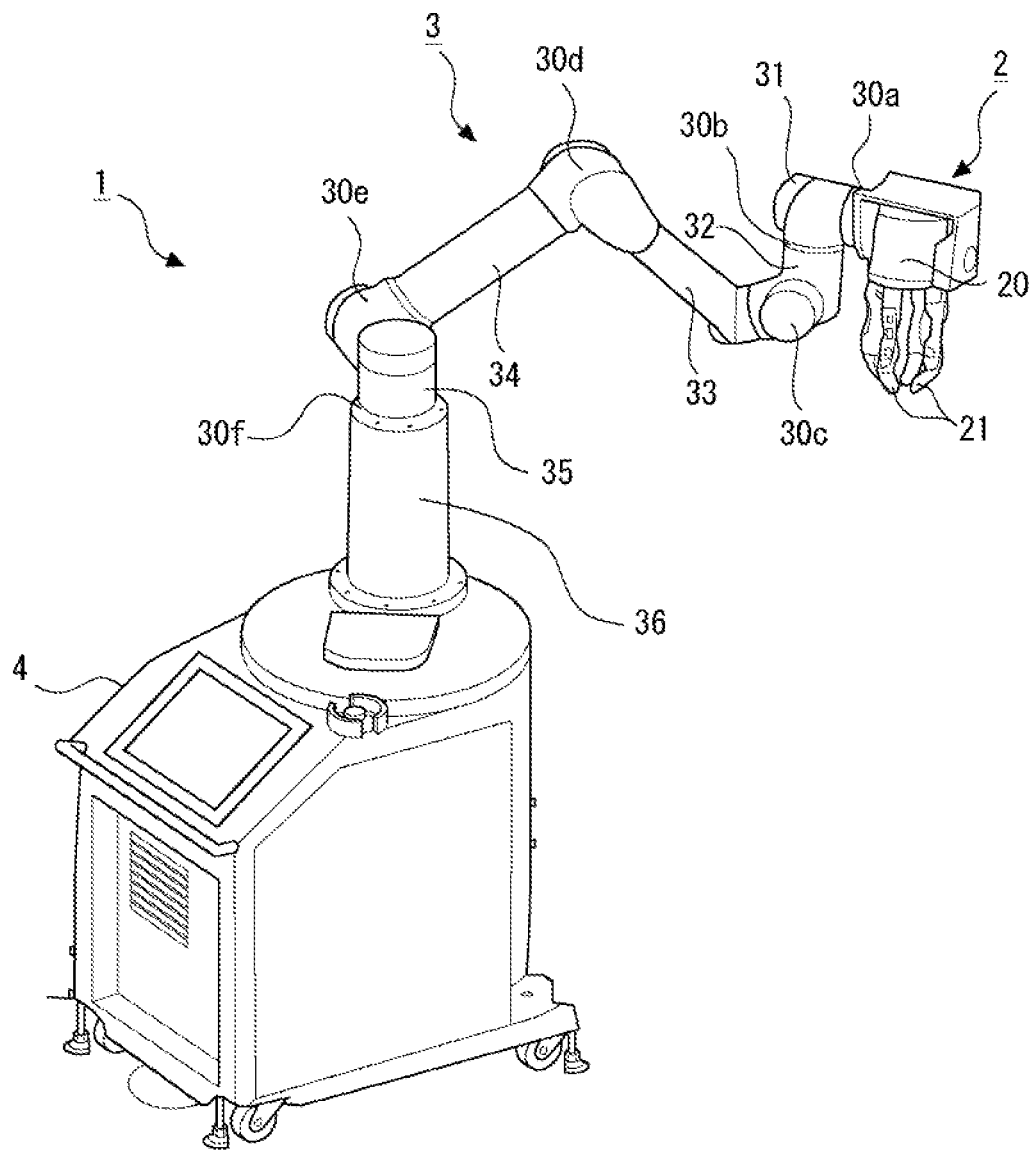

[Fig. 2]
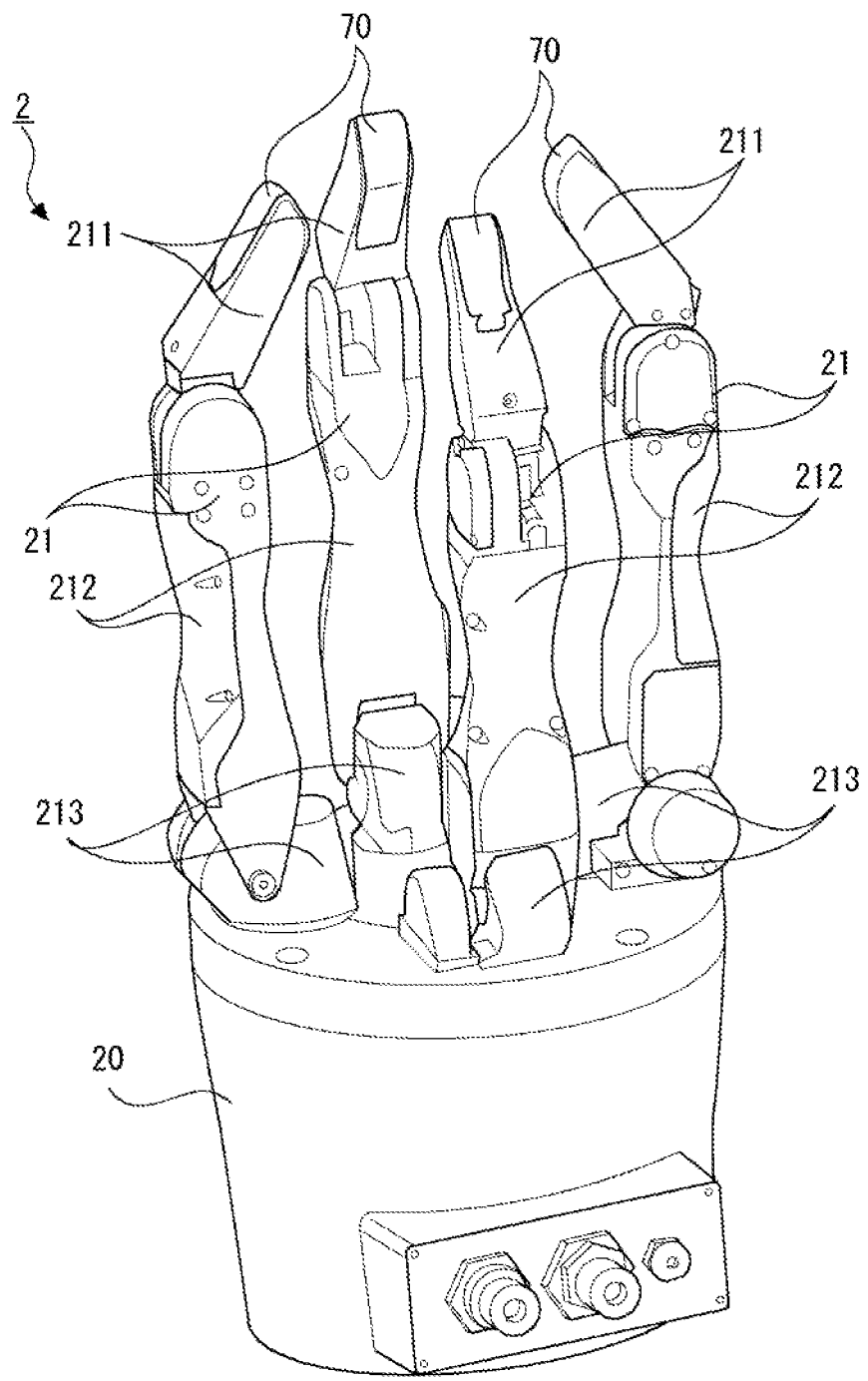

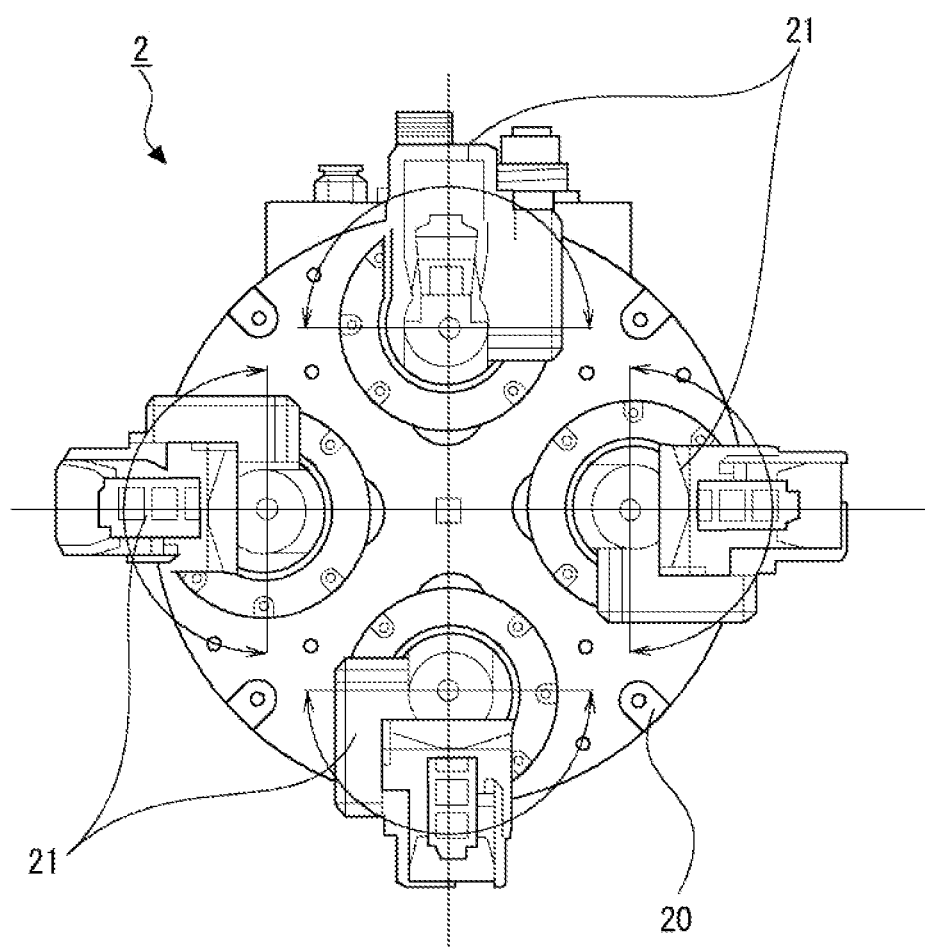
[Fig. 3]

[Fig. 4]
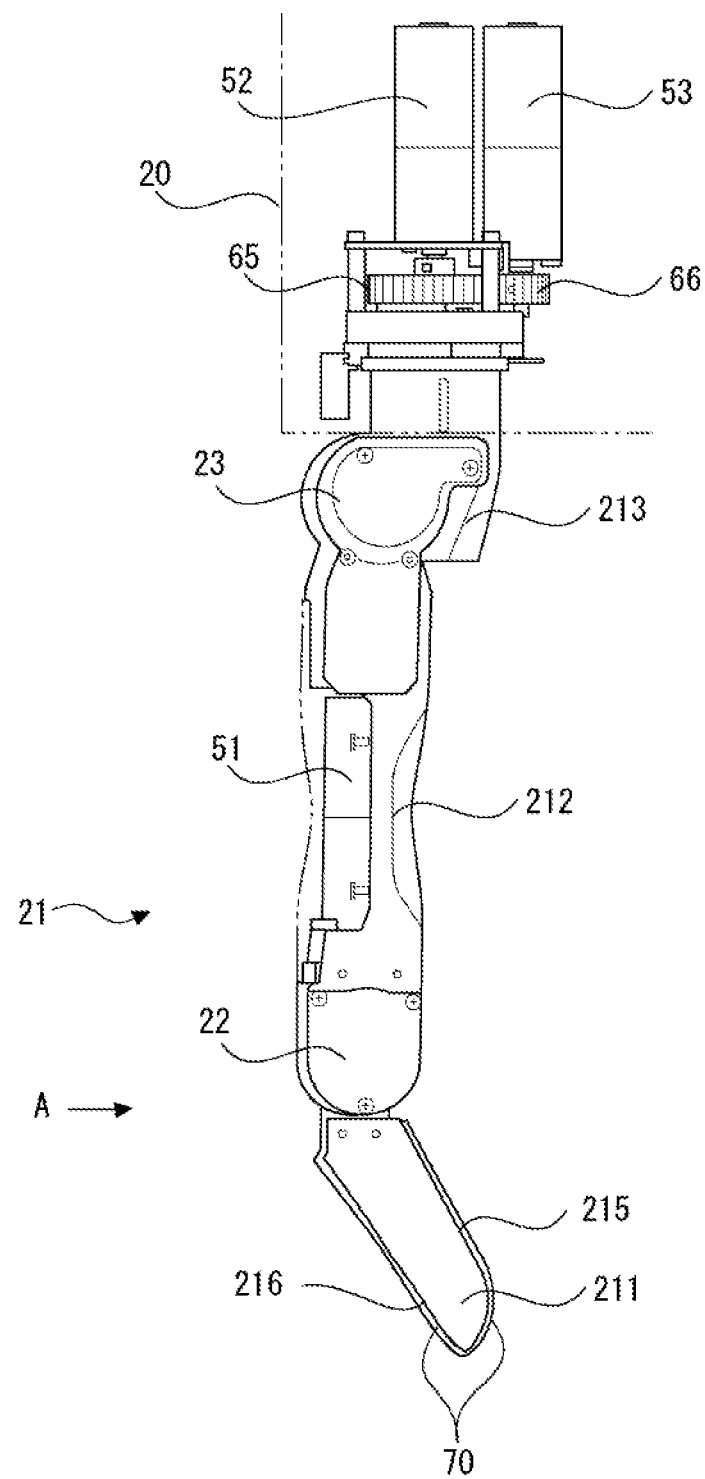

[Fig. 5]
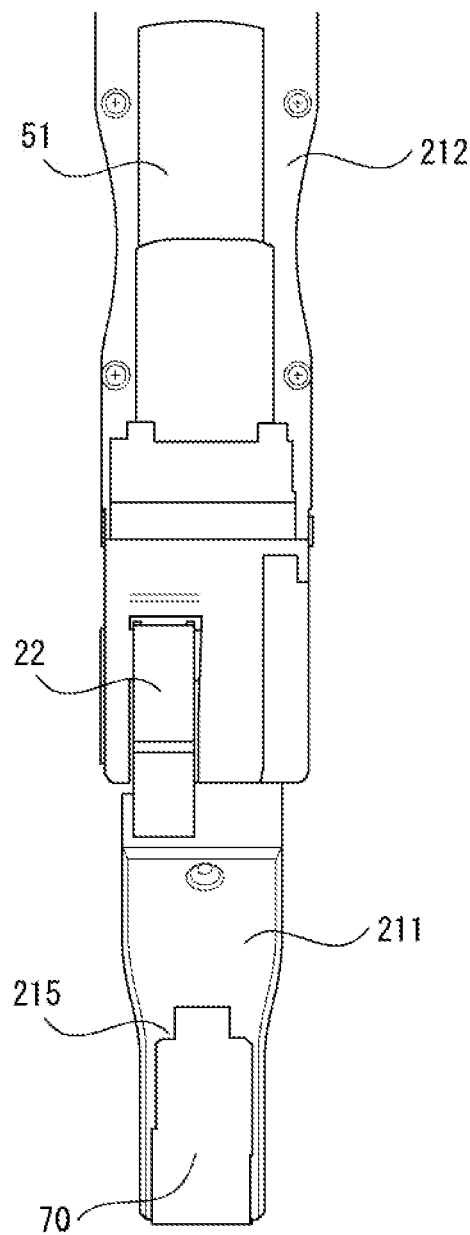

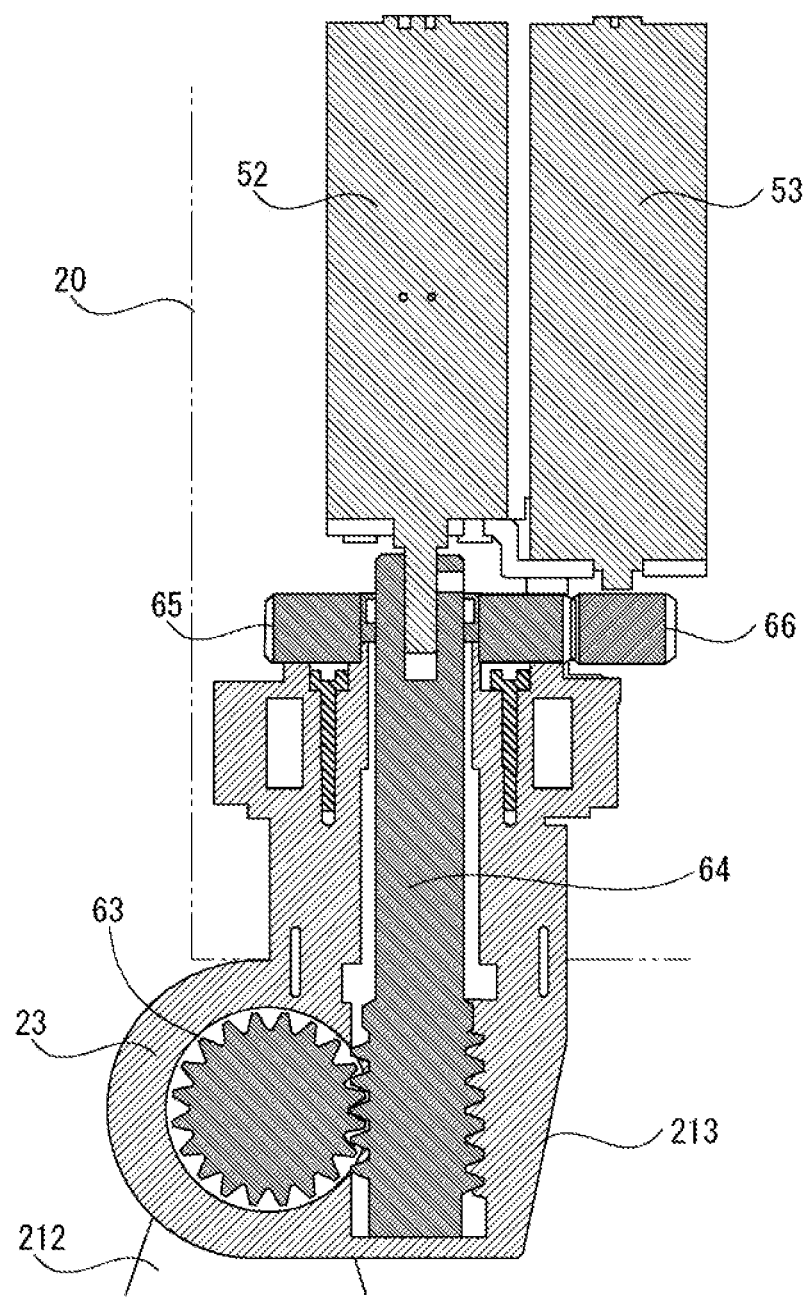
[Fig. 6]

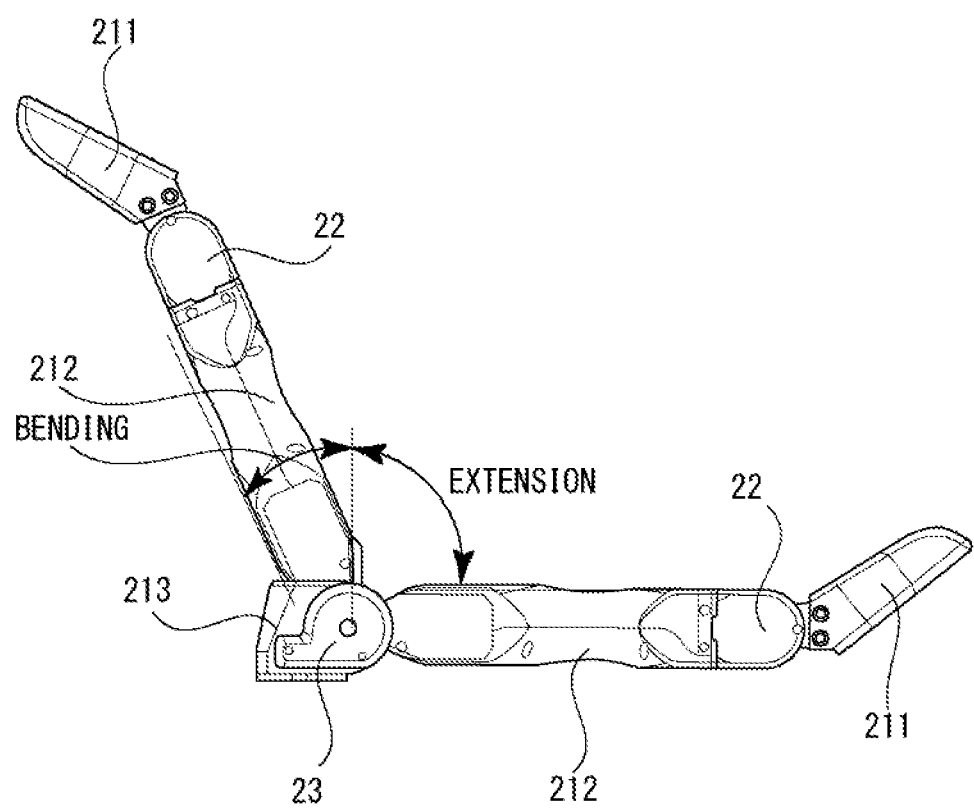
[Fig. 7]

[Fig. 8]
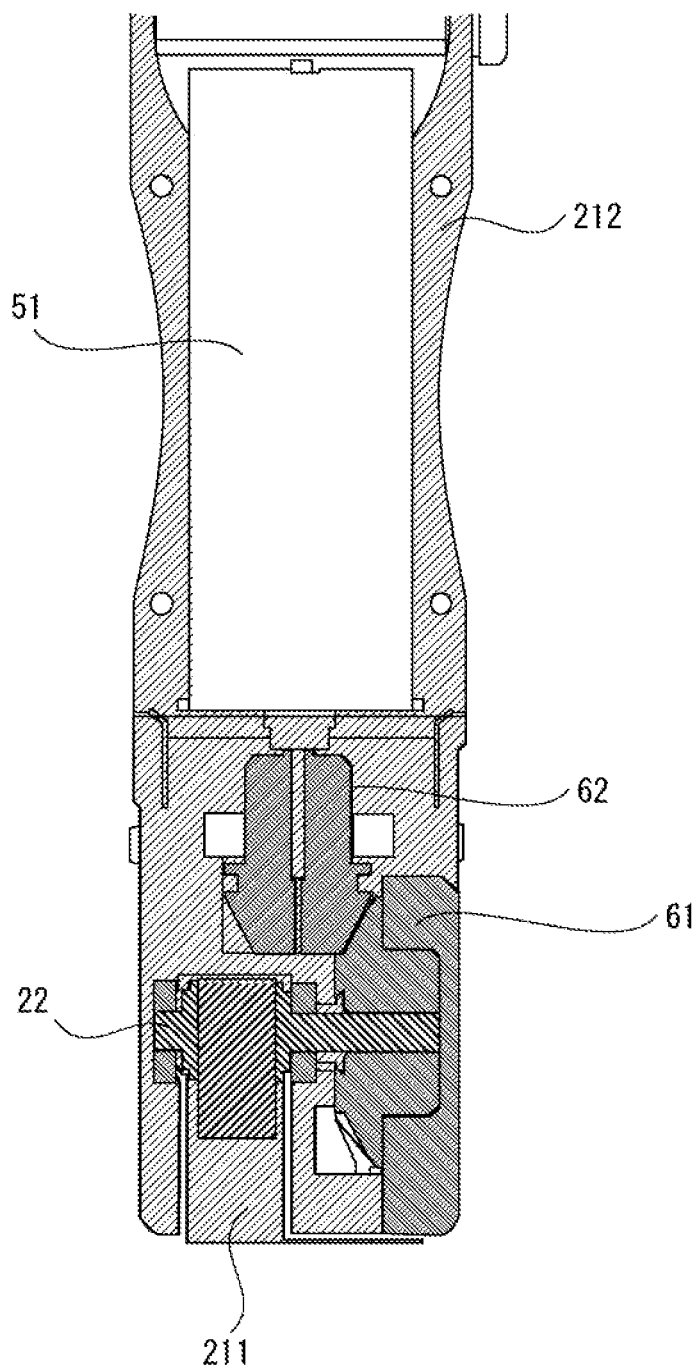

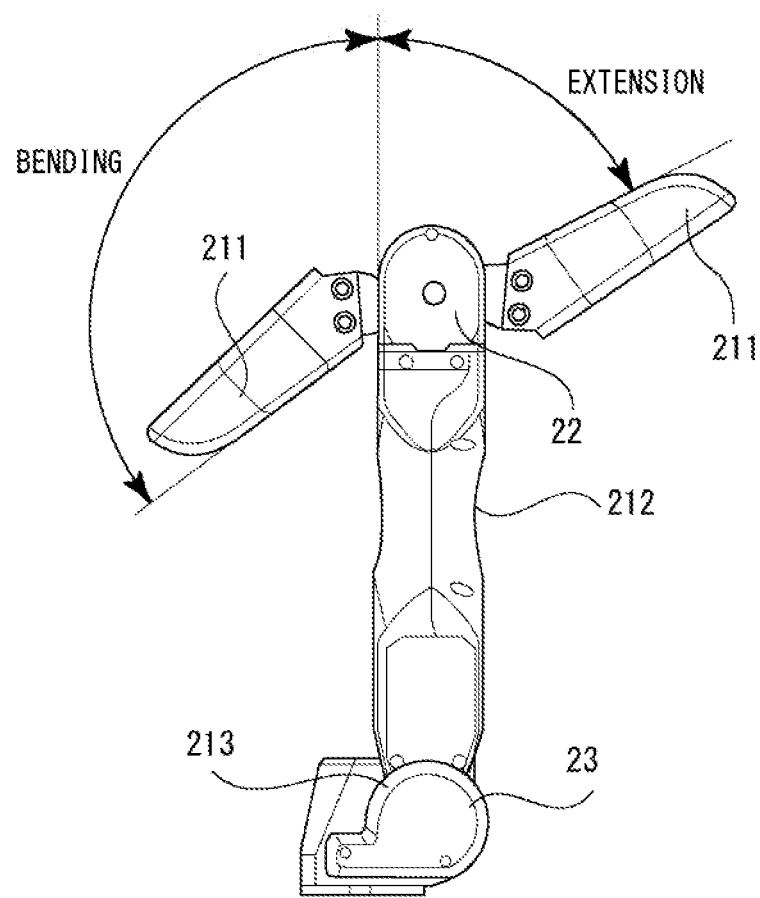
[Fig. 9]

[Fig. 10]
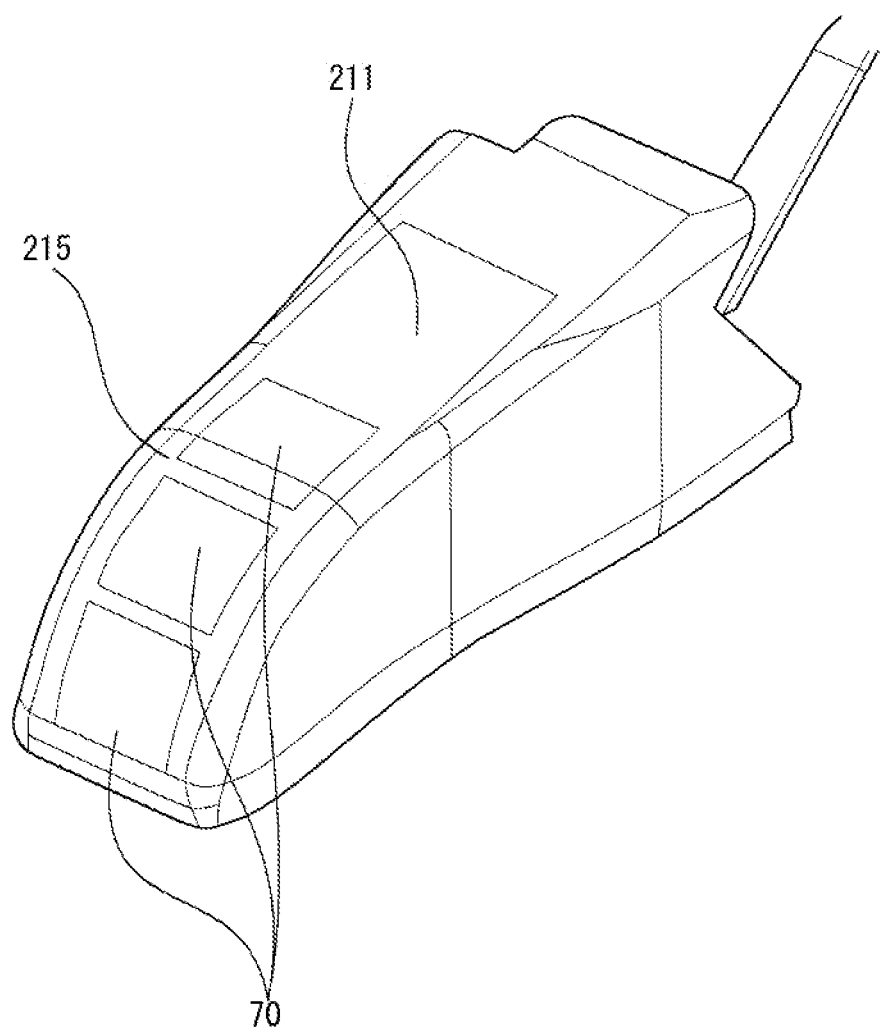

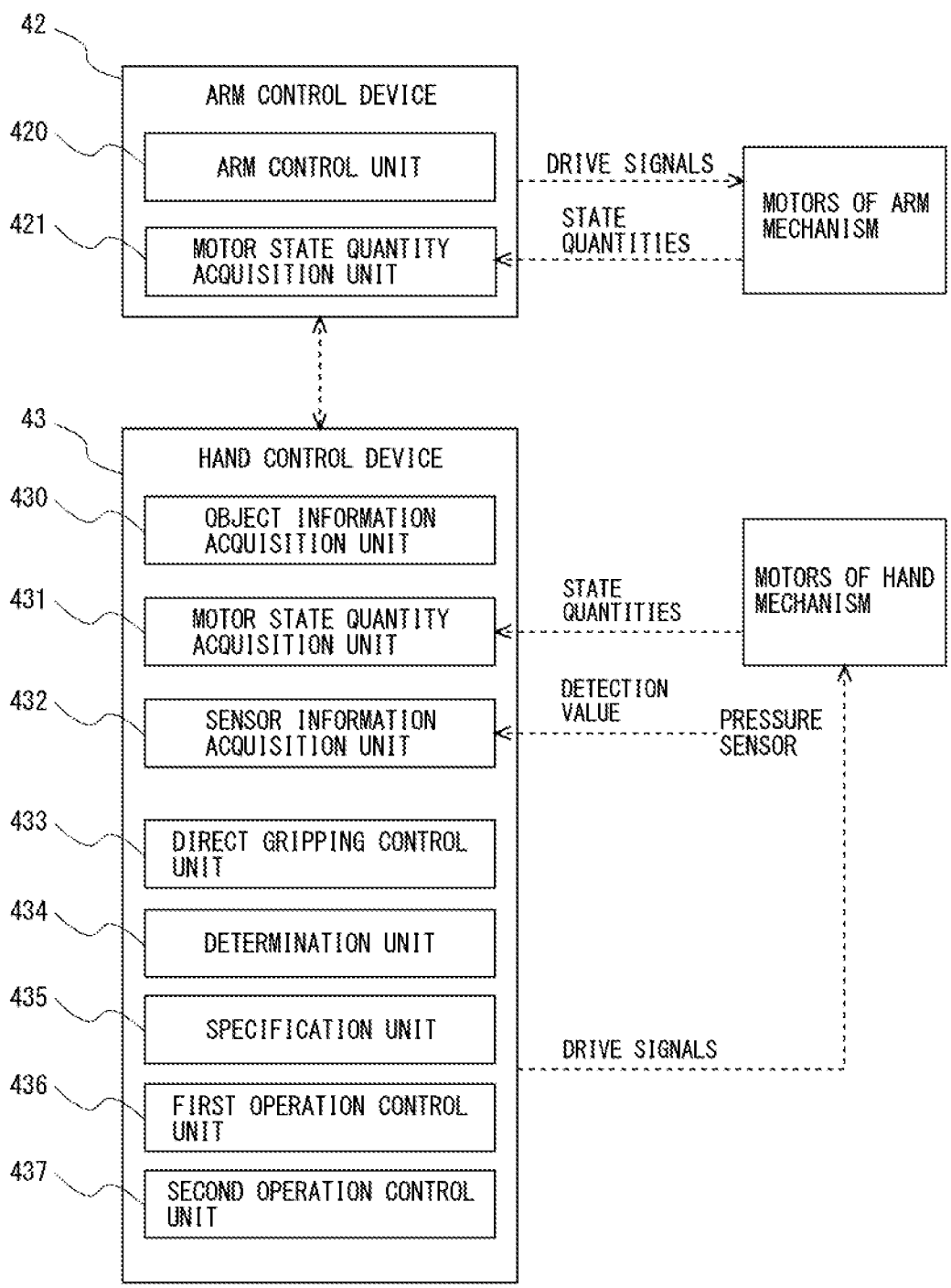
[Fig. 11]

[Fig. 12]
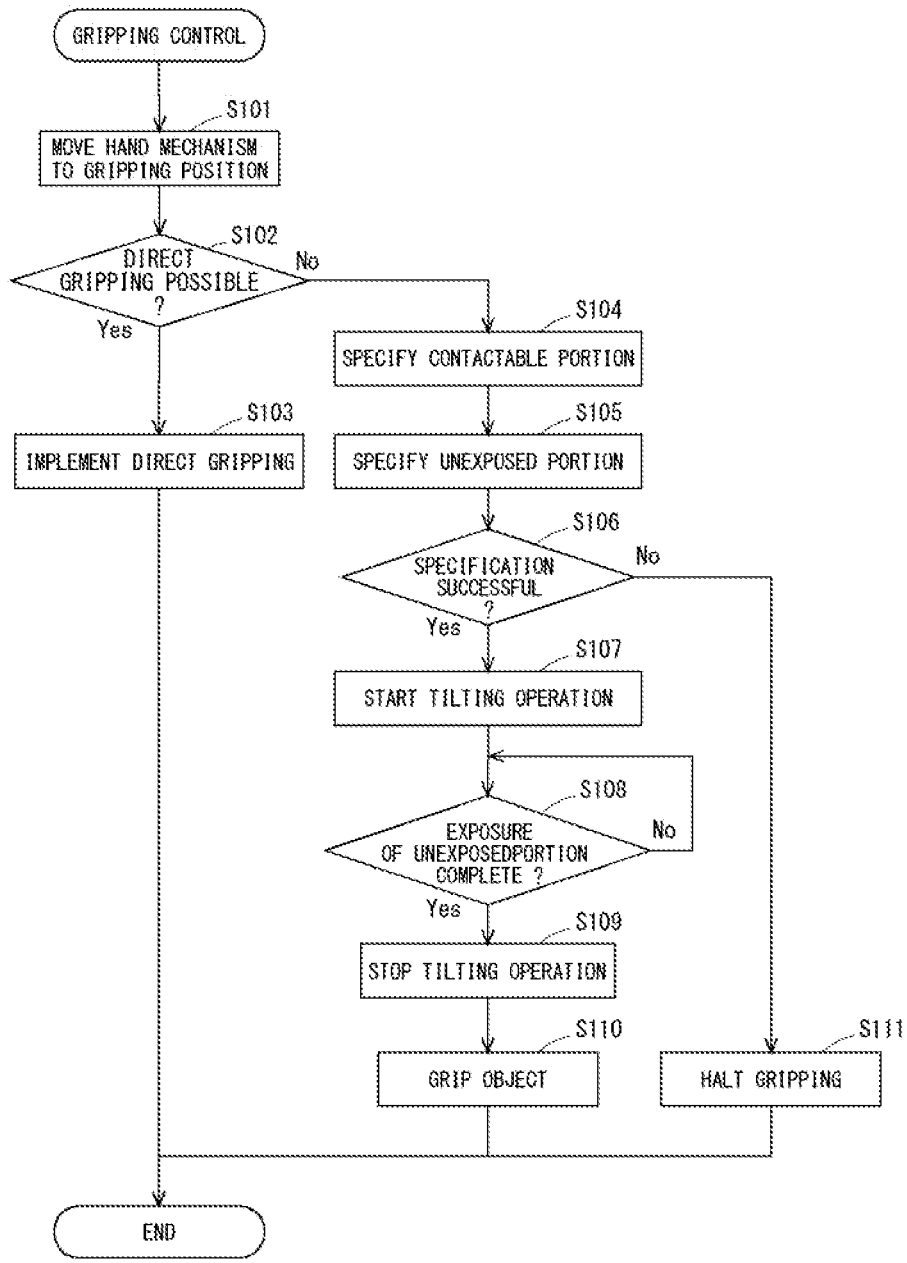

[Fig. 13]
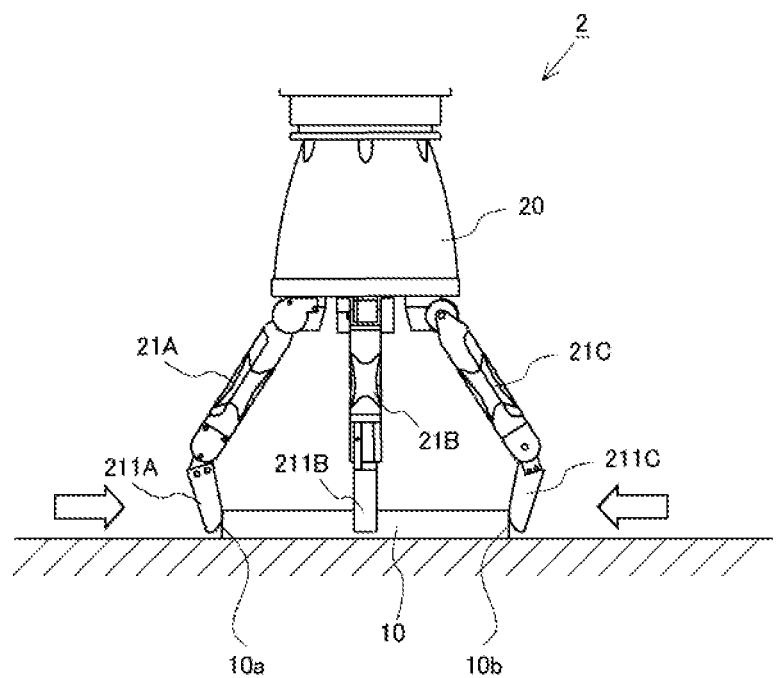

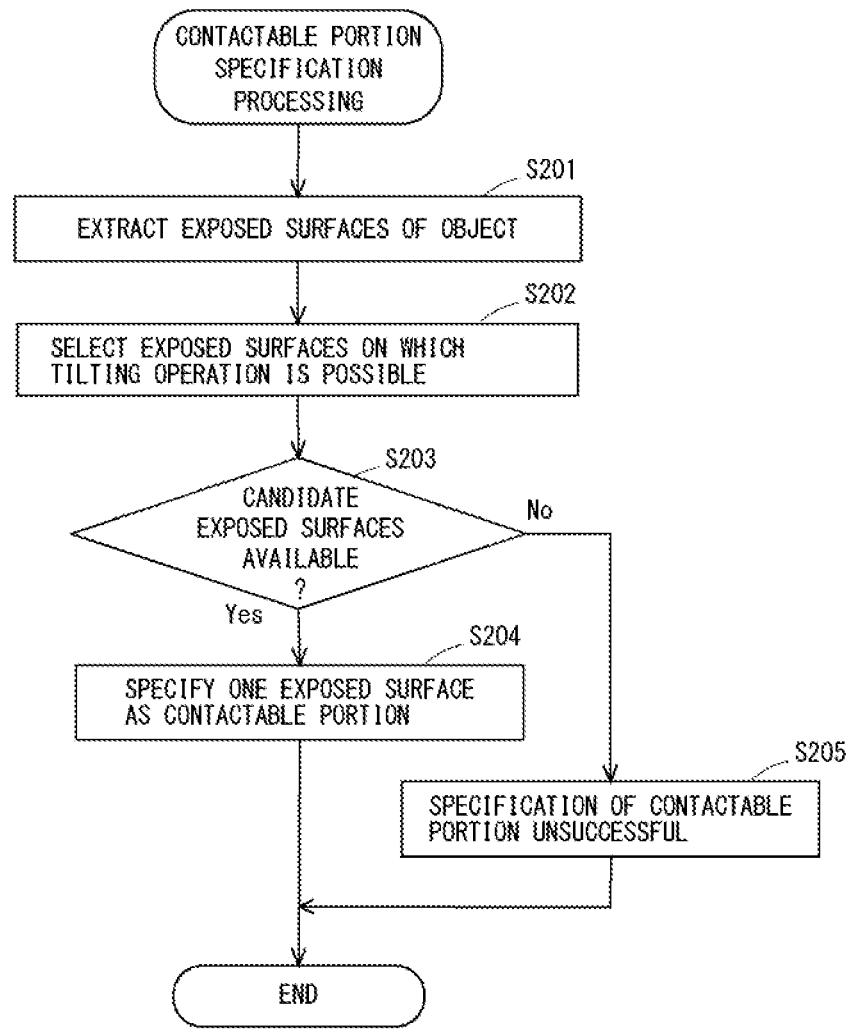
[Fig. 14]

[Fig. 15]
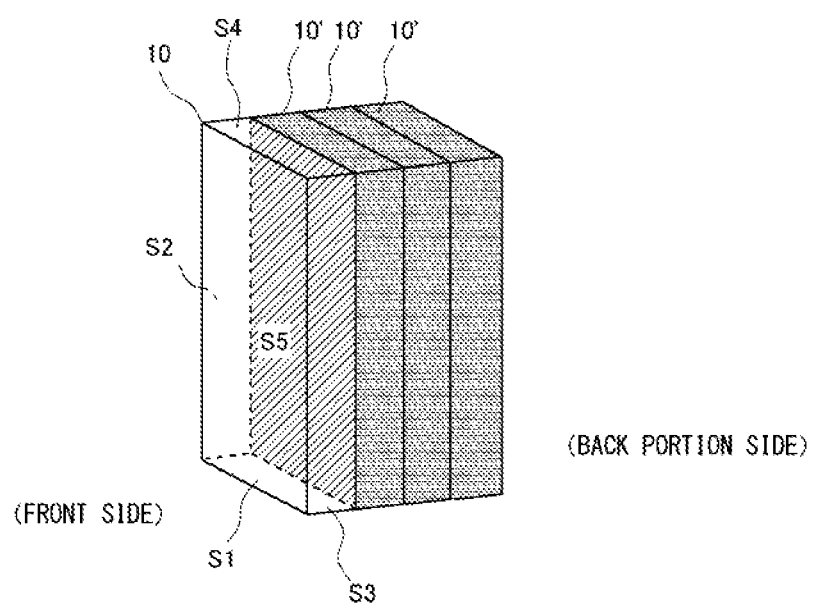

[Fig. 16]
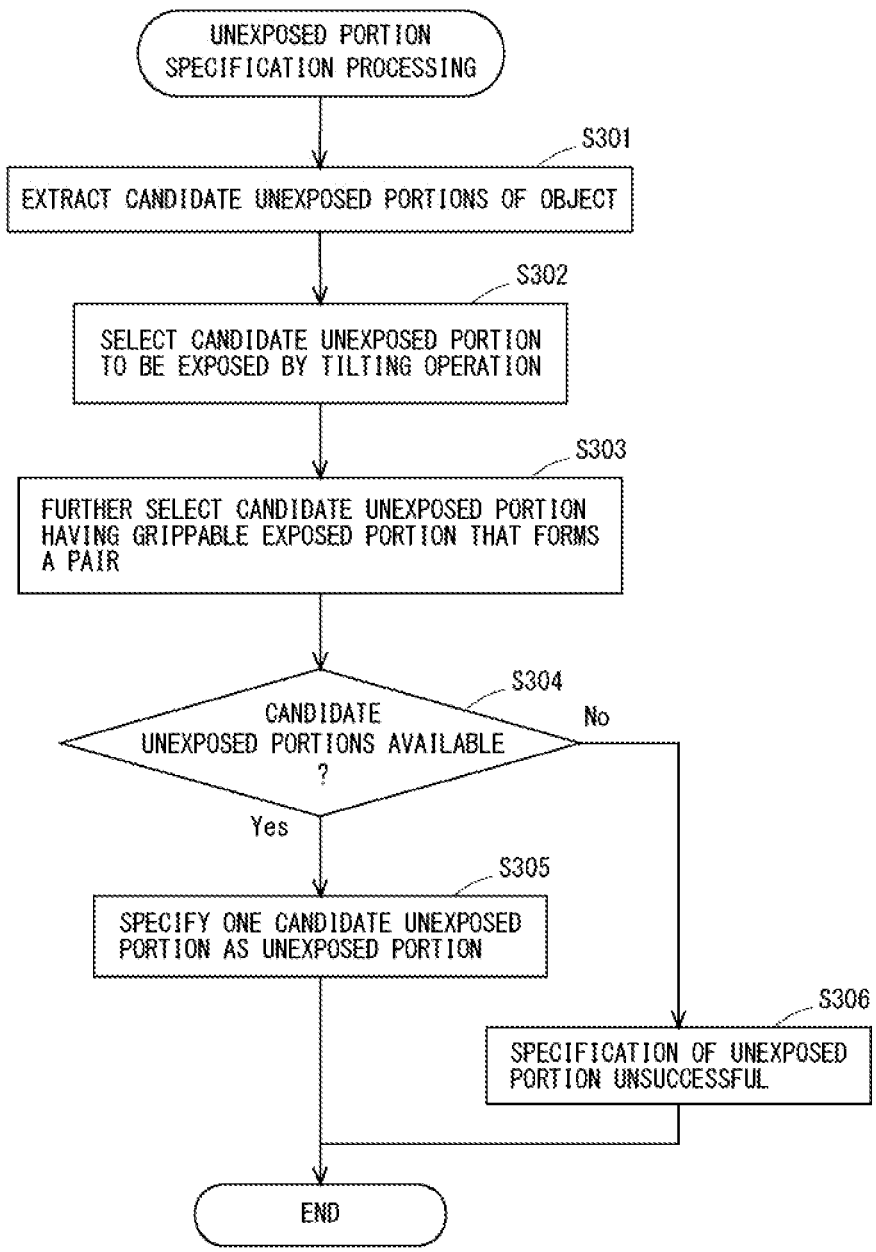

[Fig. 17A]
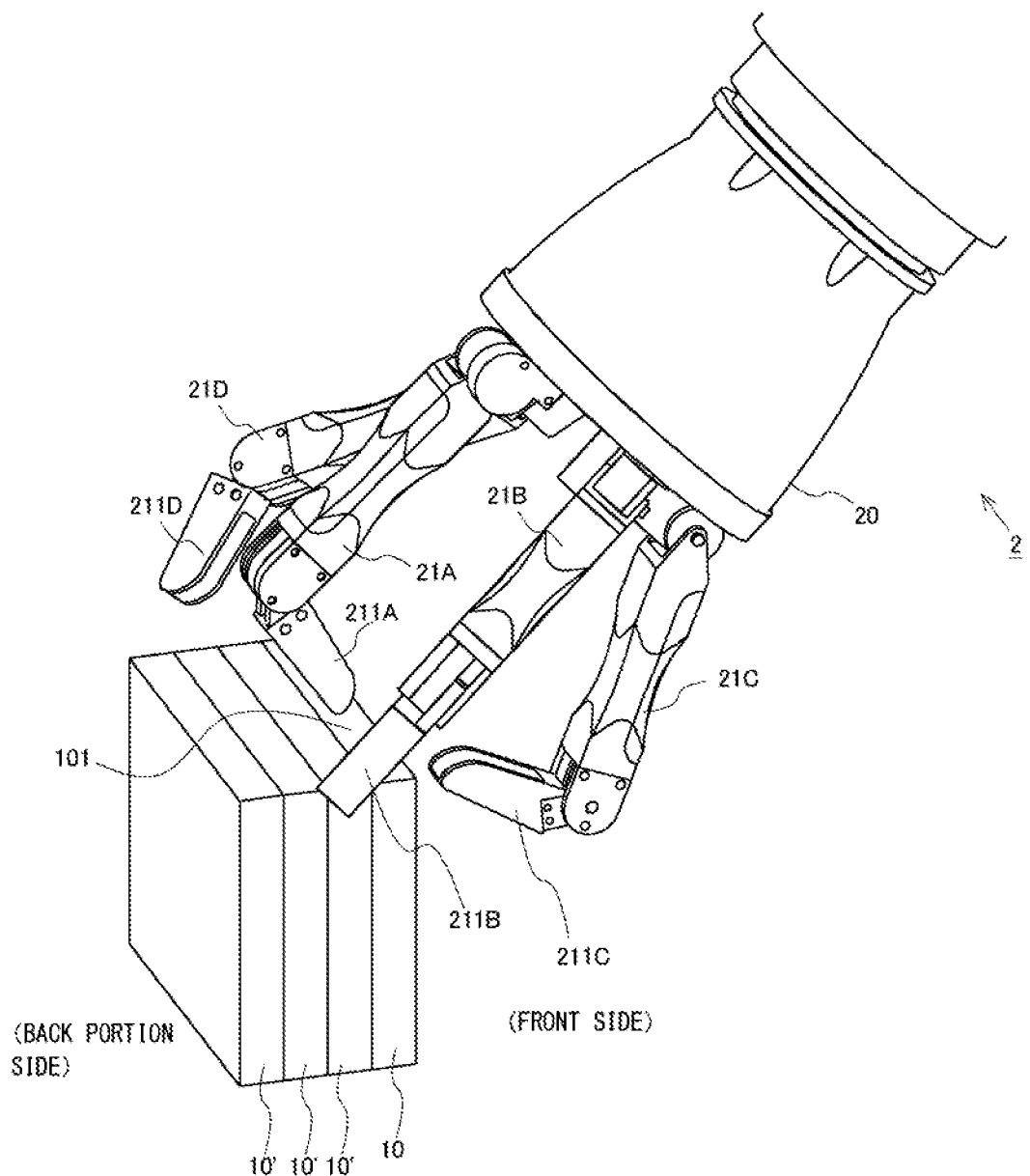

[Fig. 17B]
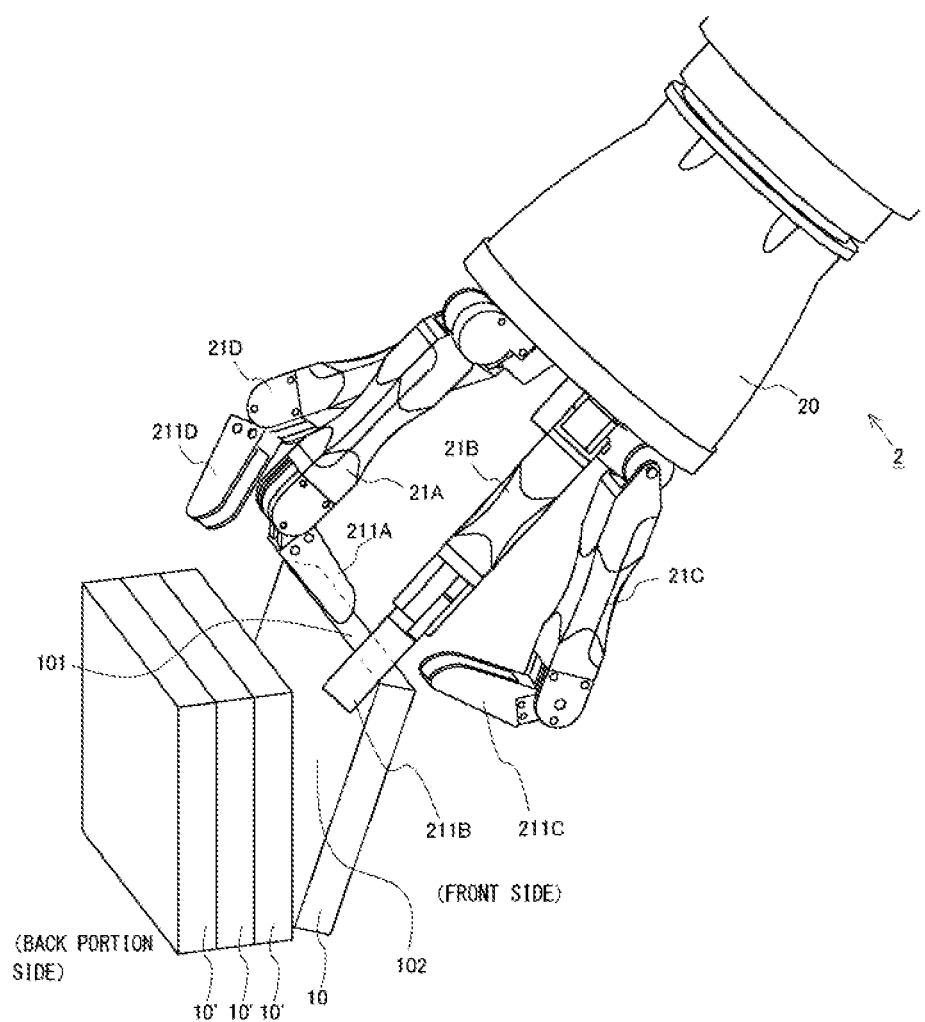

[Fig. 18A]
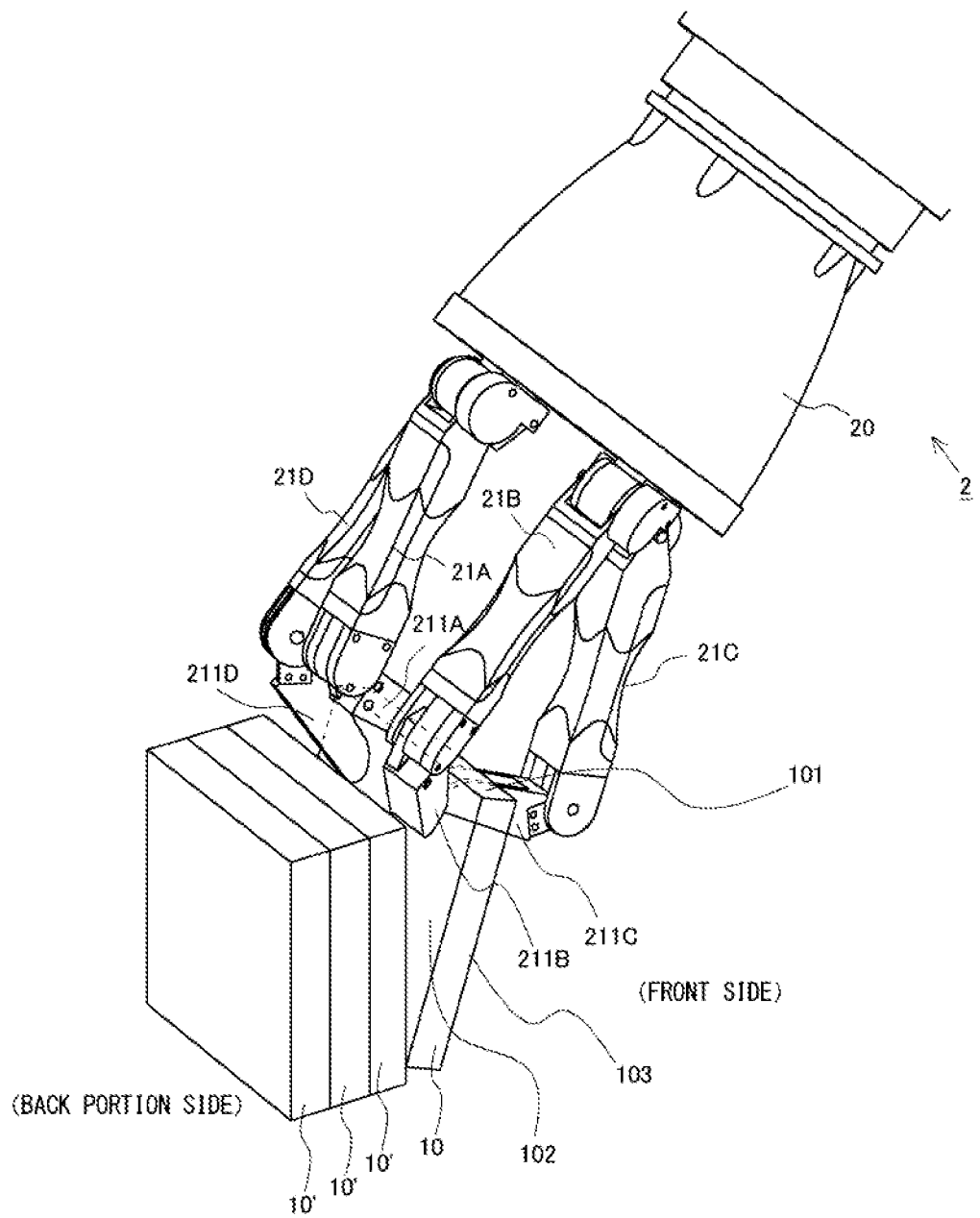

[Fig. 18B]
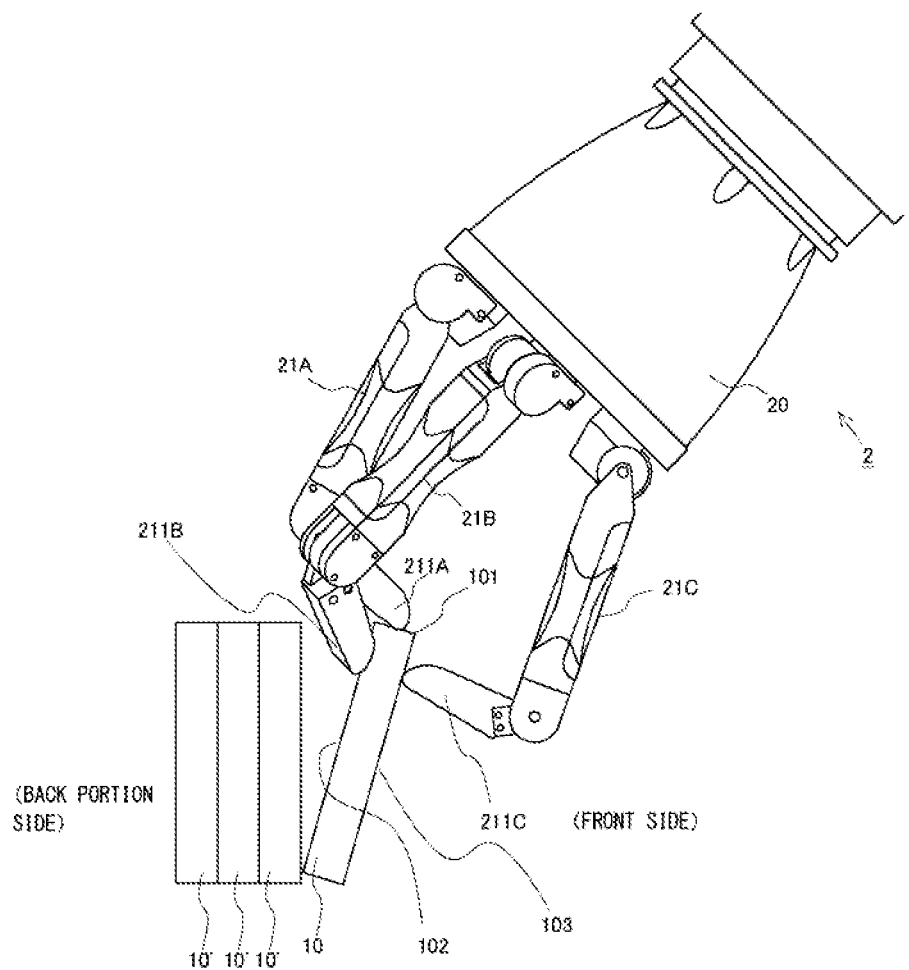

[Fig. 18C]
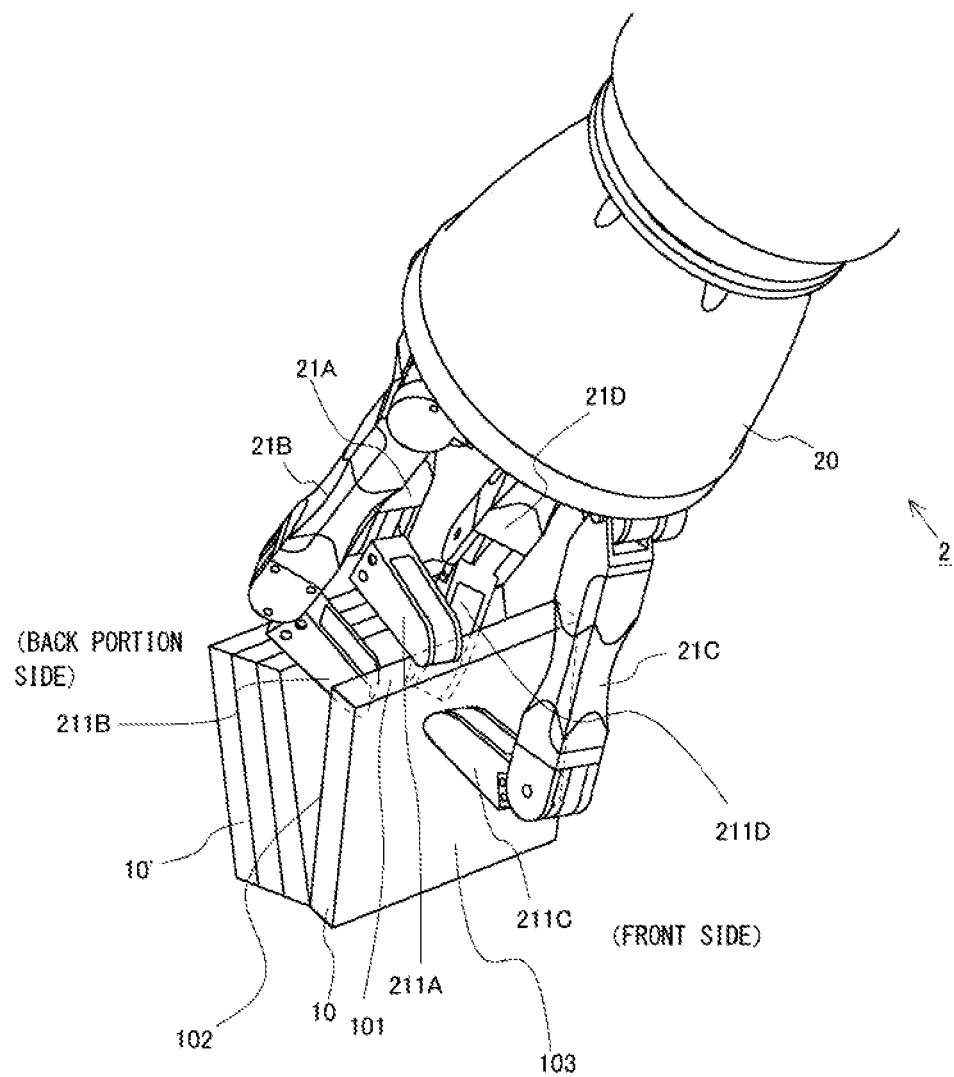

[Fig. 19]
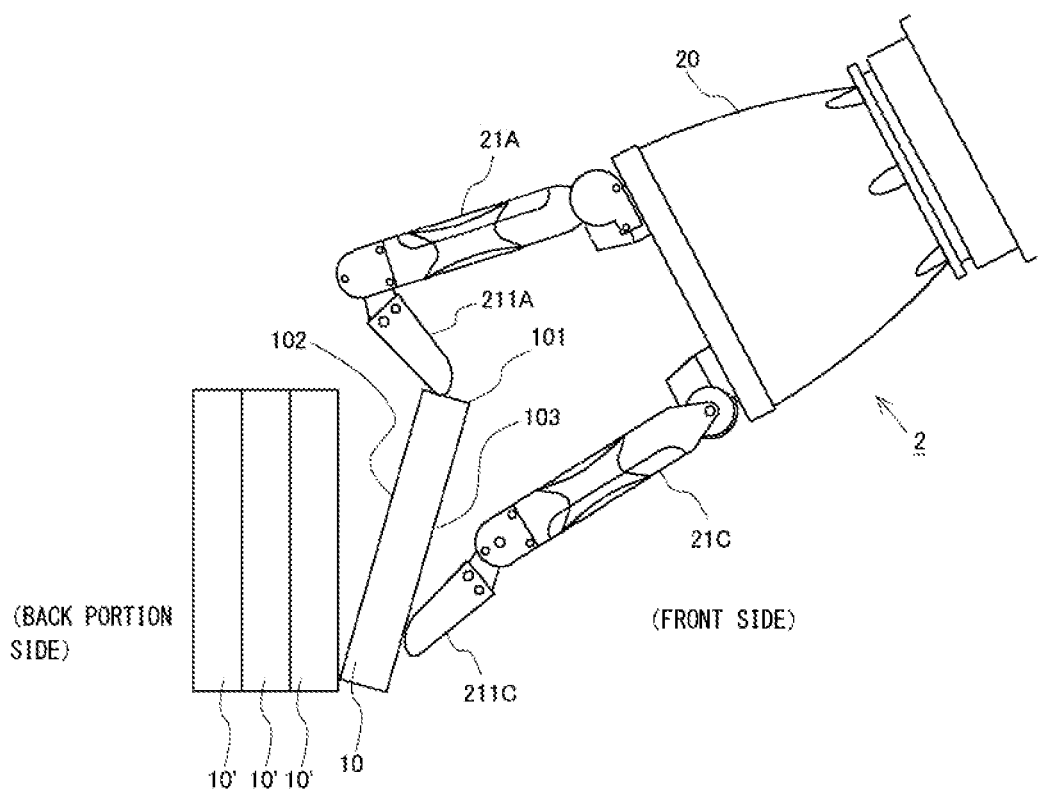

[Fig. 20]
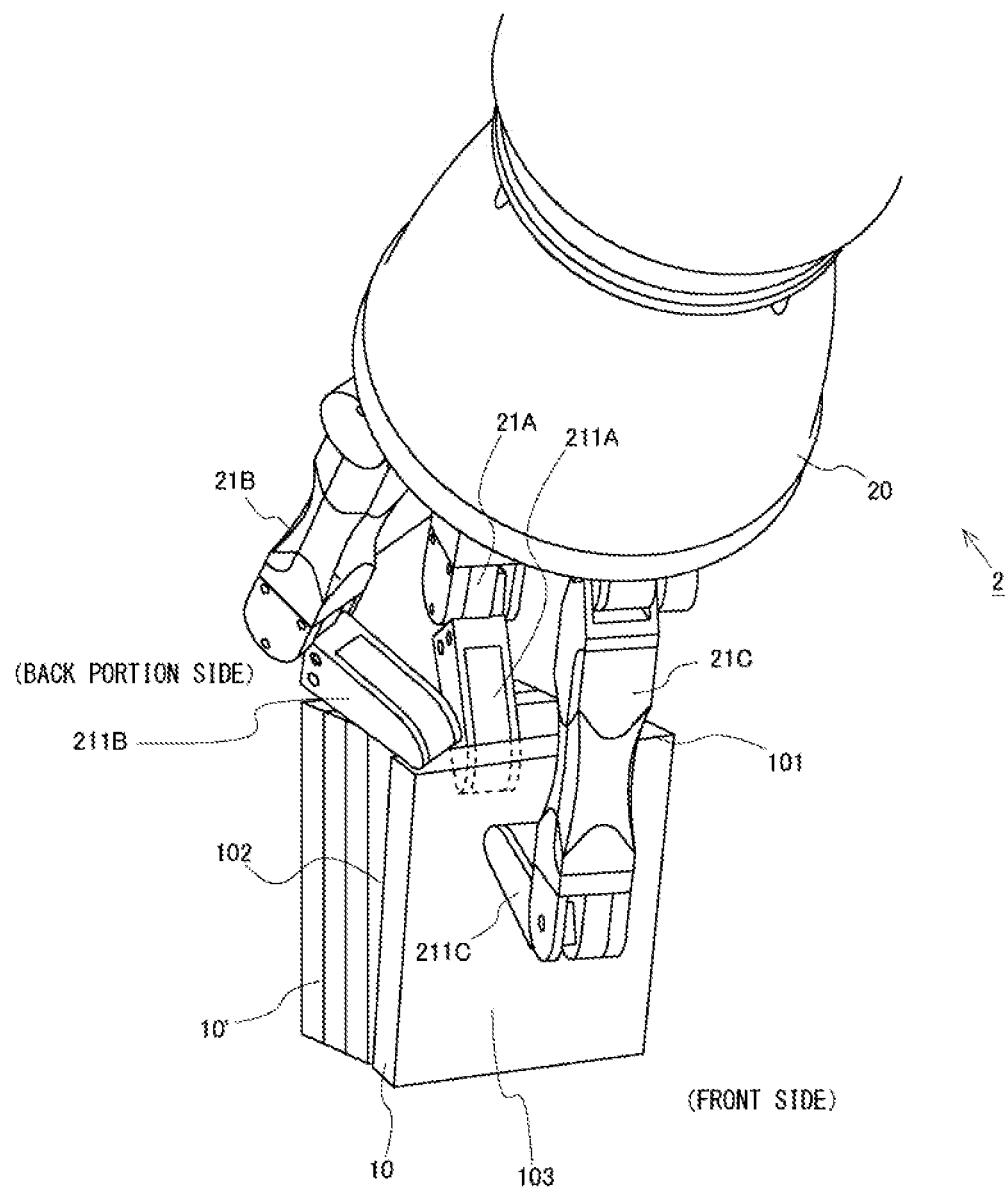

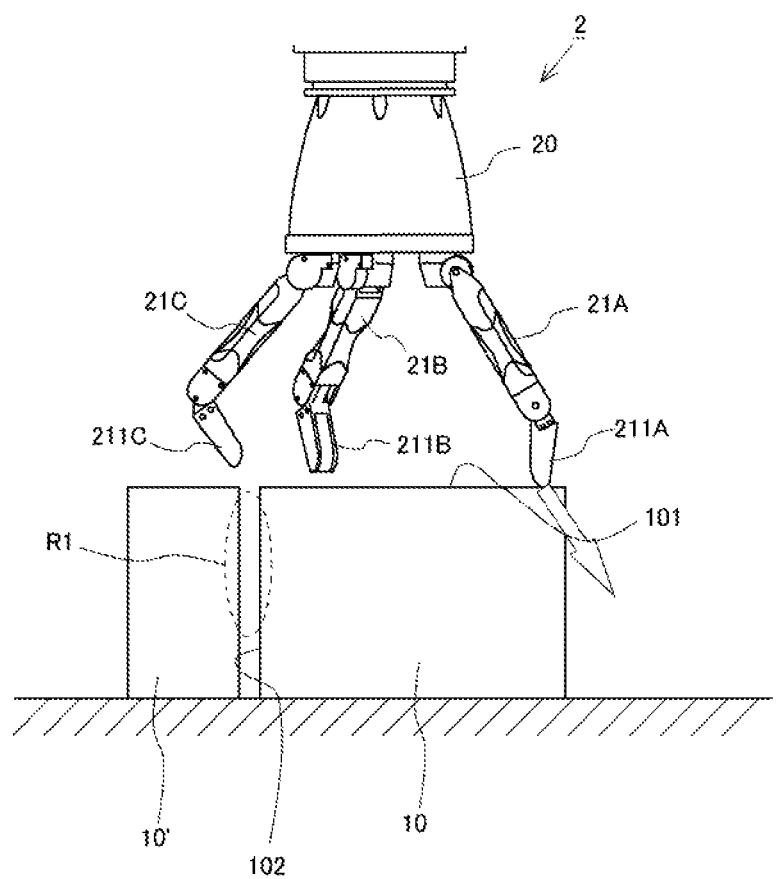
[Fig. 21]

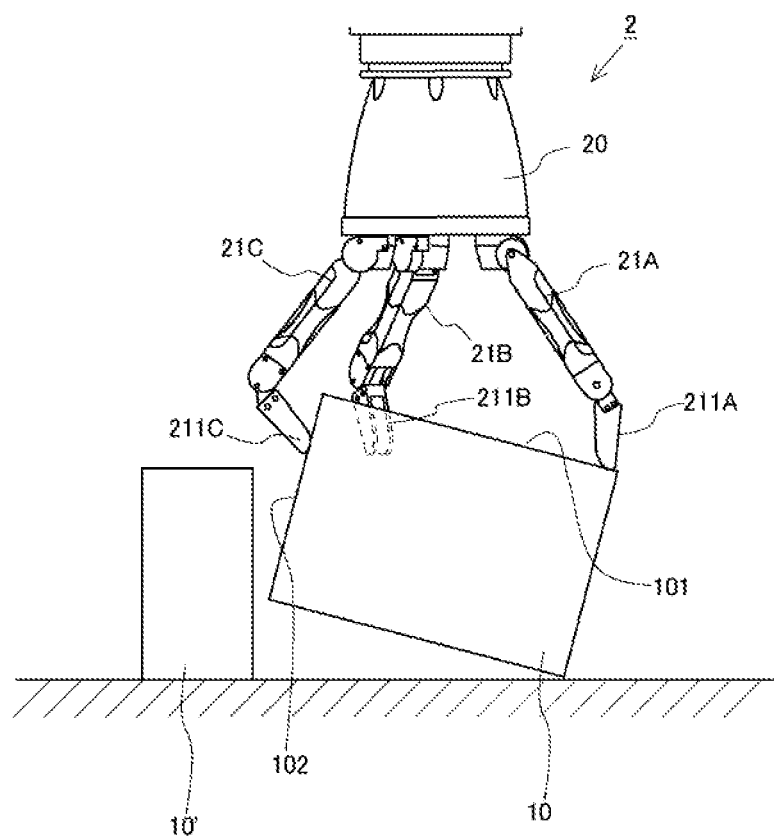
[Fig. 22]

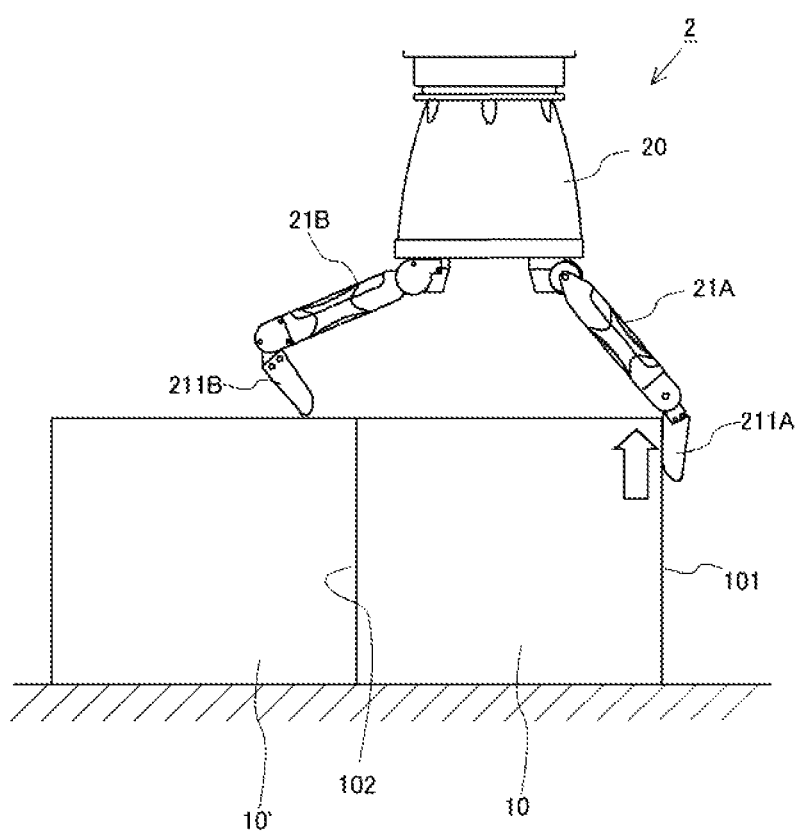
[Fig. 23]

[Fig. 24]
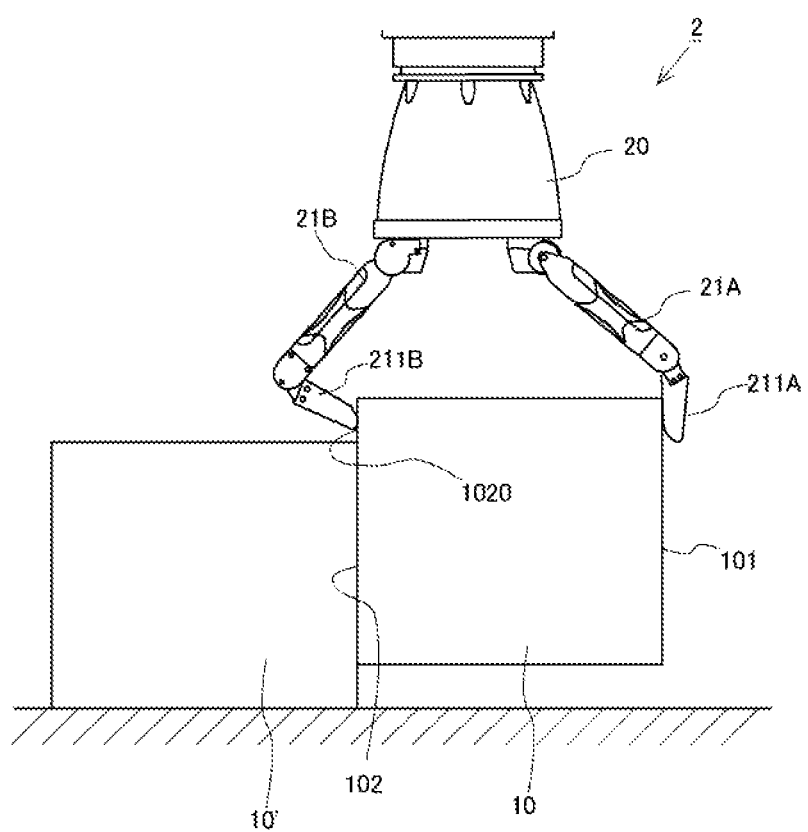

[Fig. 25]
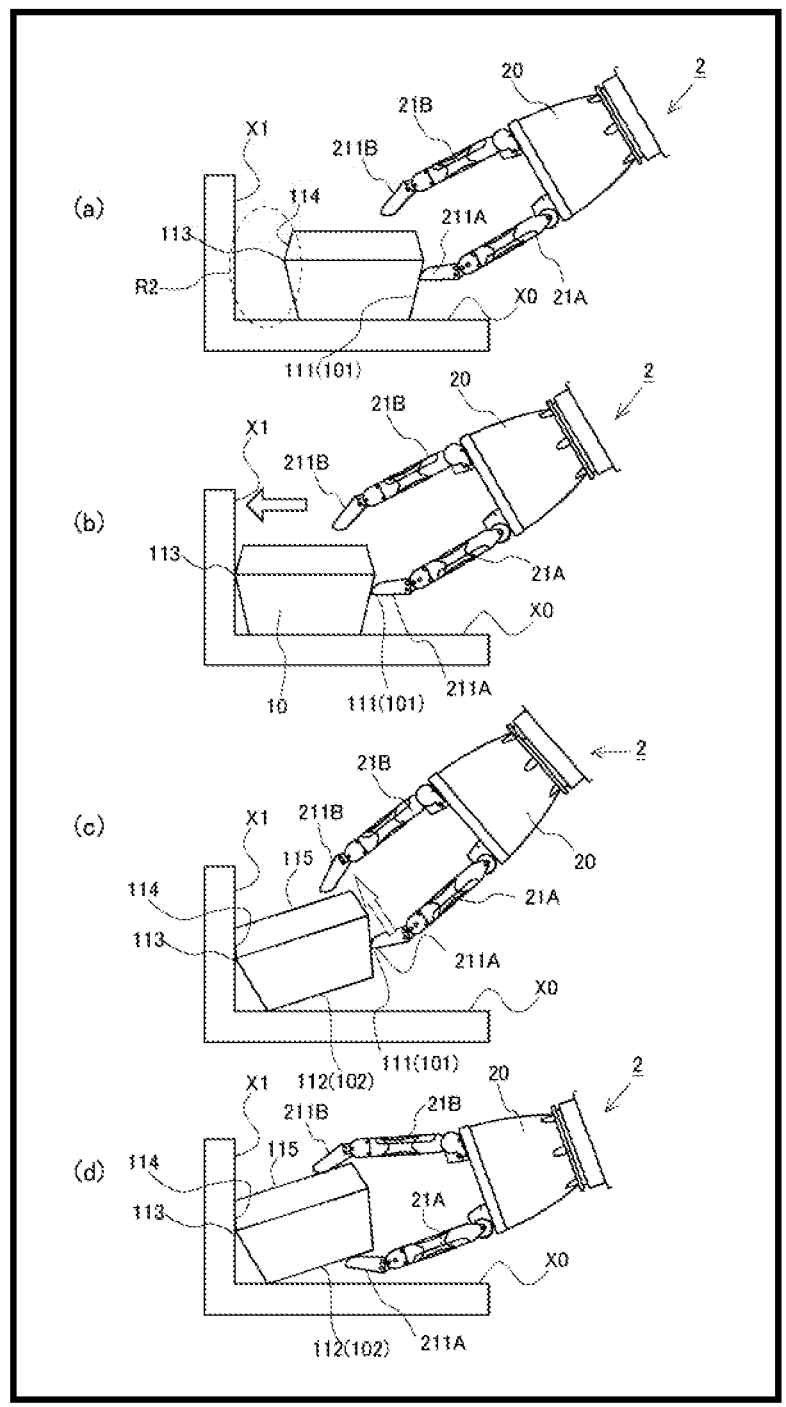

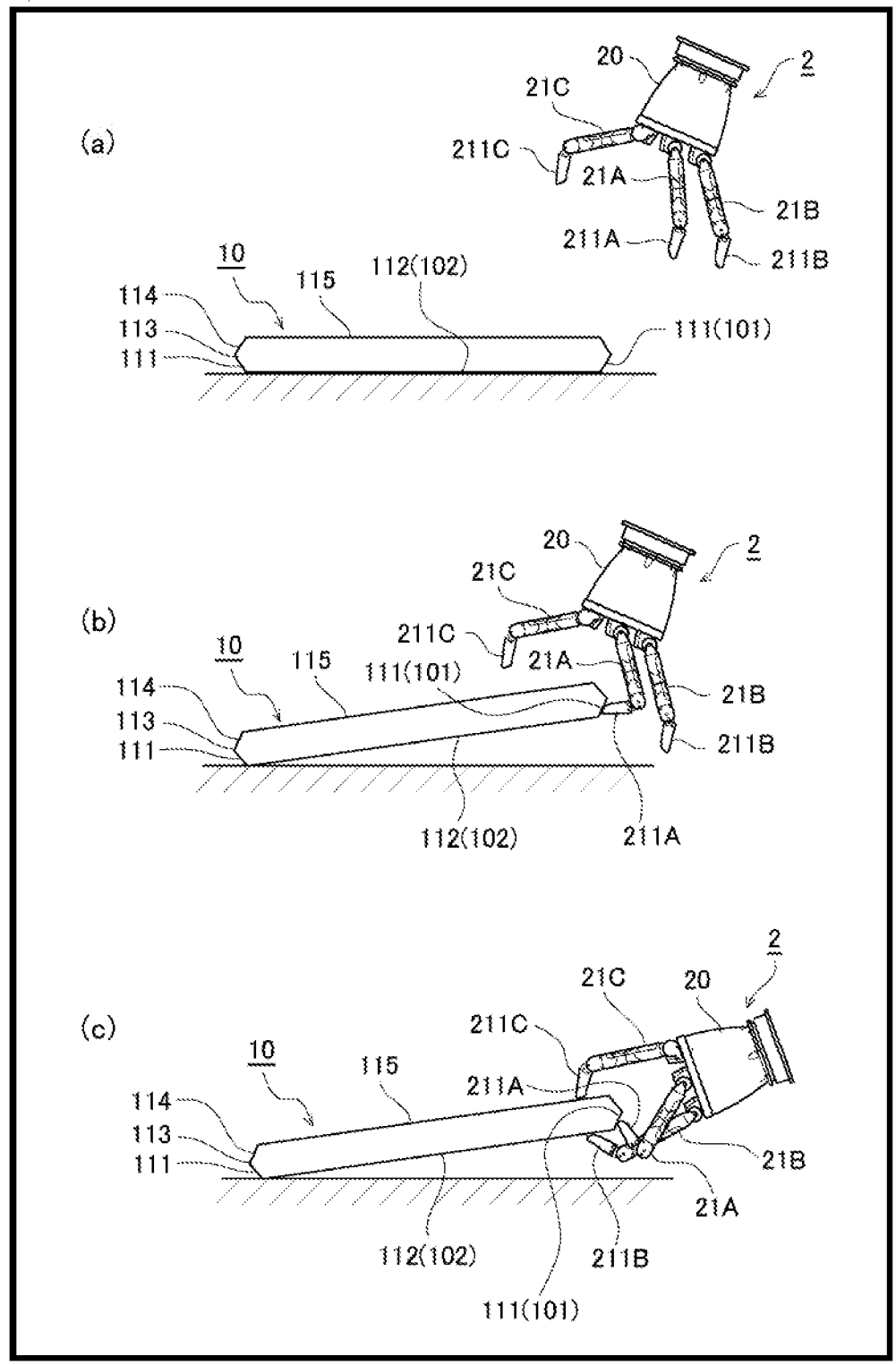
[Fig. 26]

[Fig. 27]
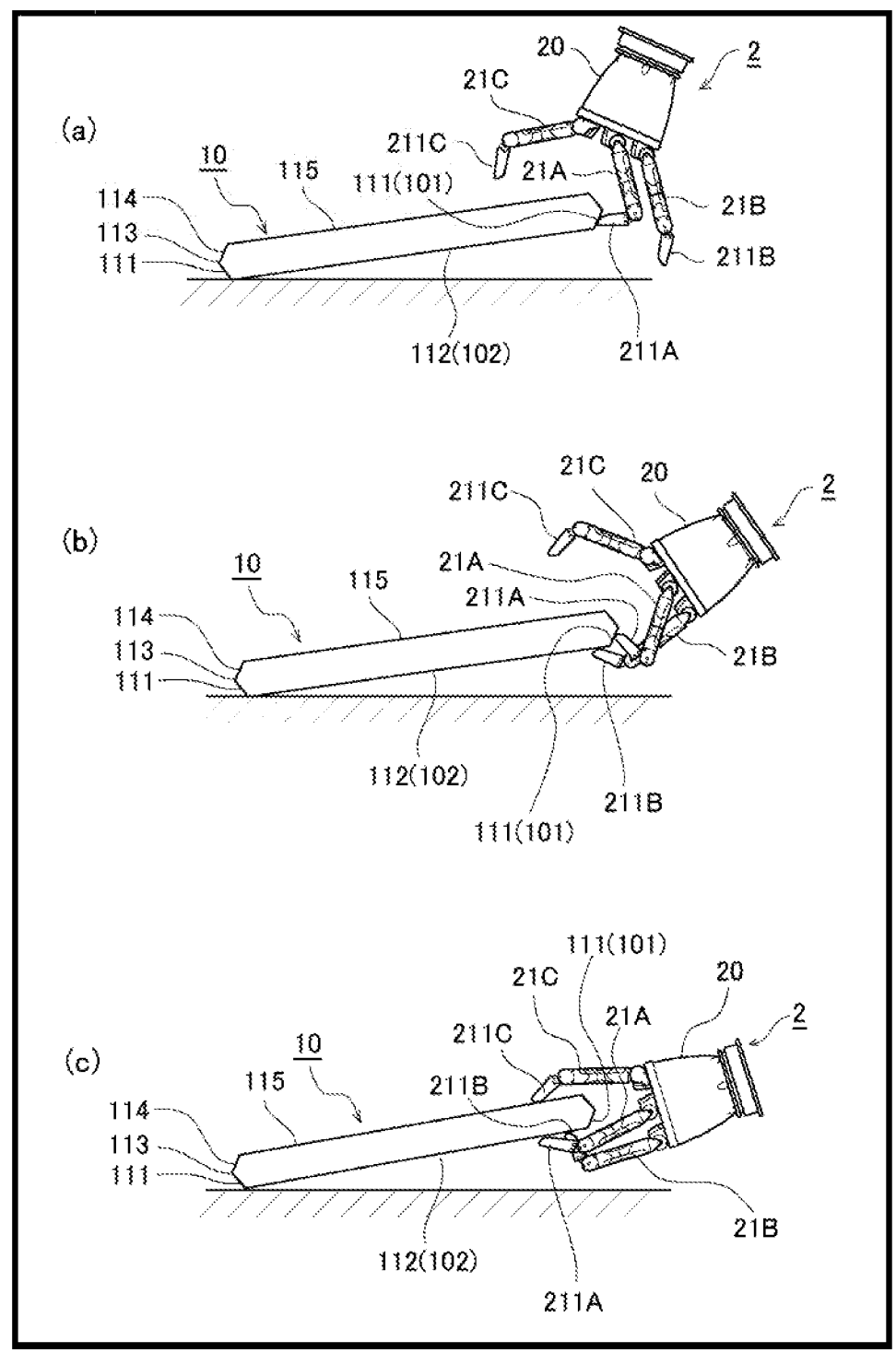

[Fig. 28]
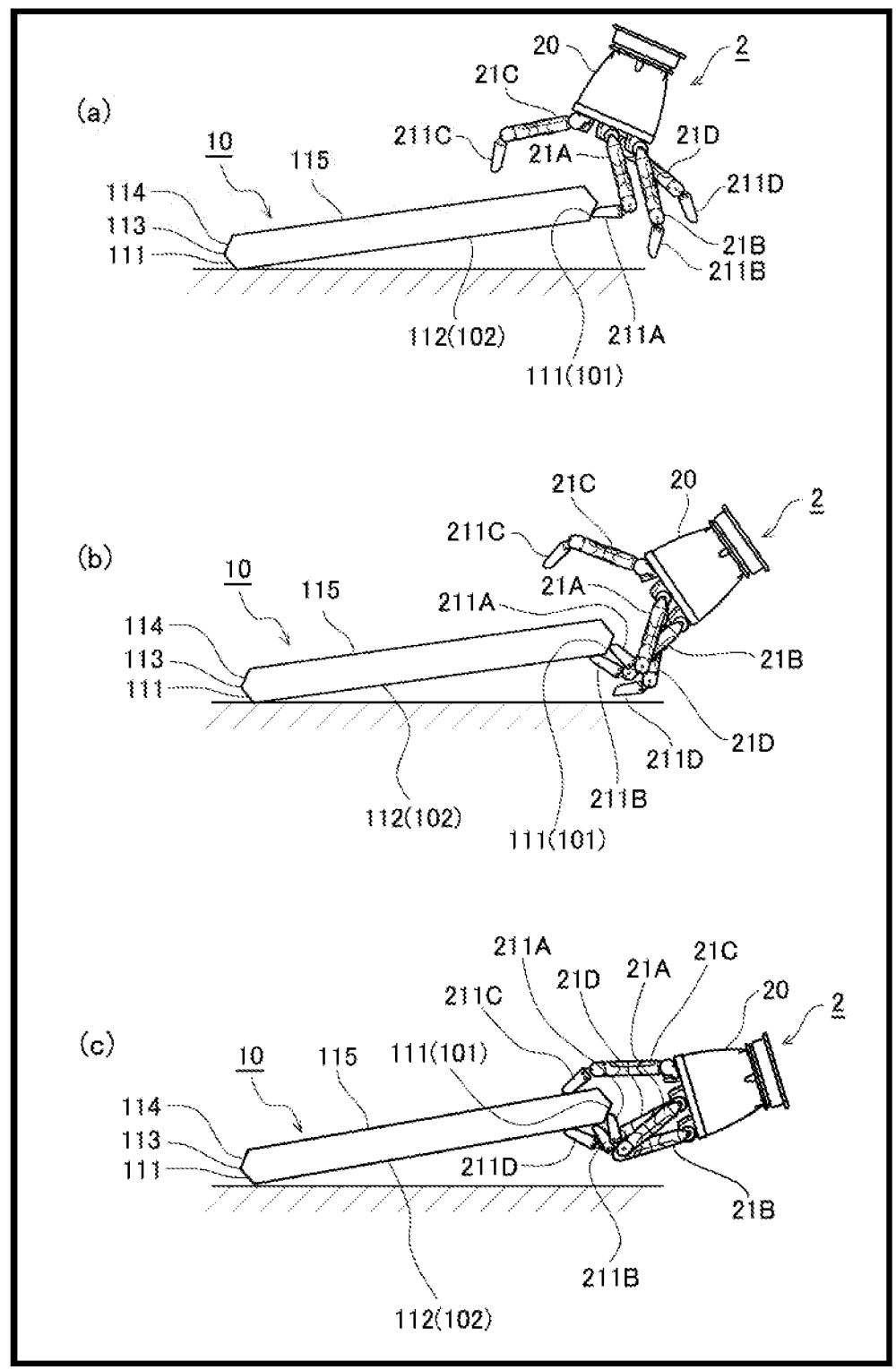

[Fig. 29]
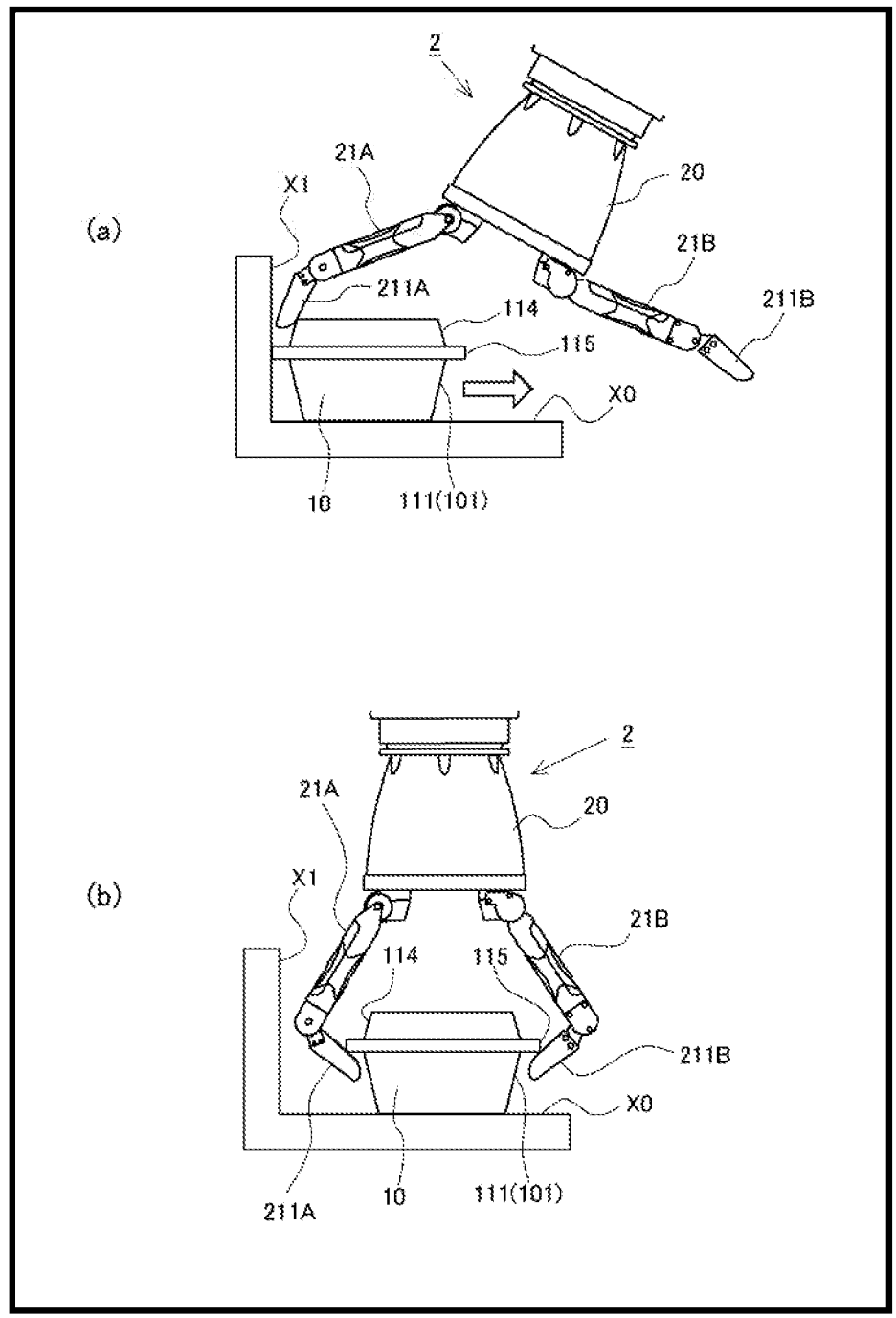

[Fig. 30]
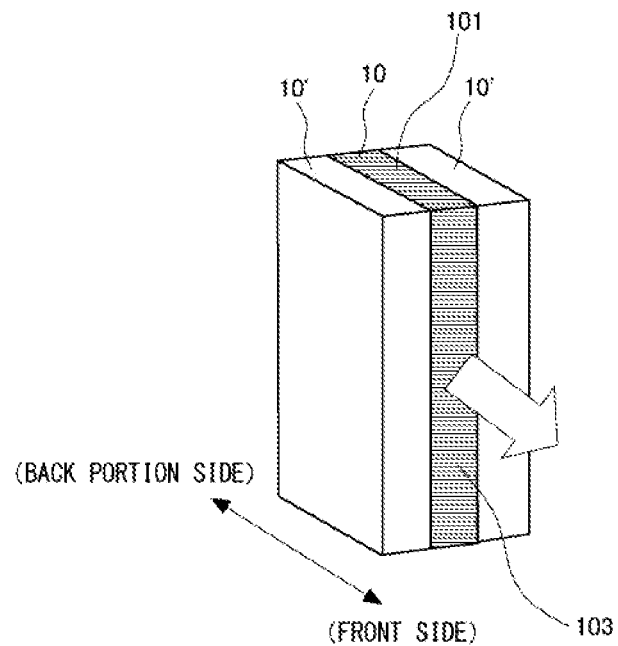
(BACK PORTION SIDE)
(FRONT SIDE)
[Fig. 31]
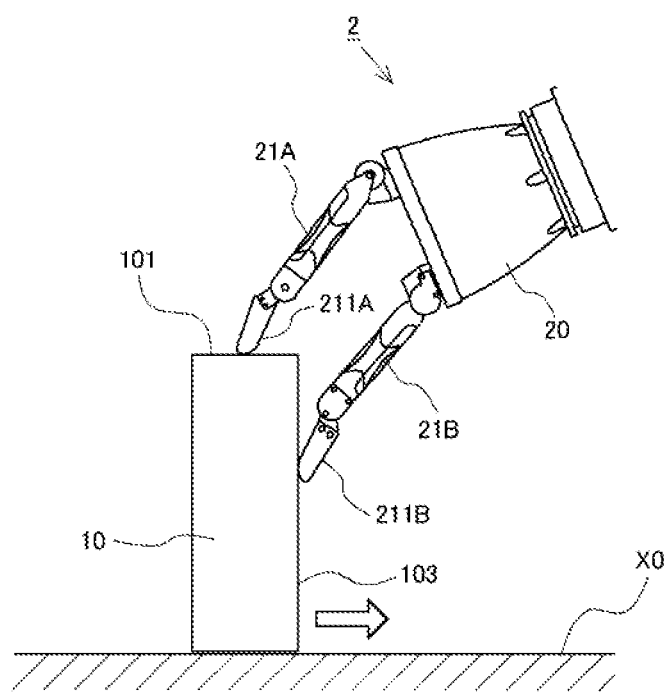

[Fig. 32]
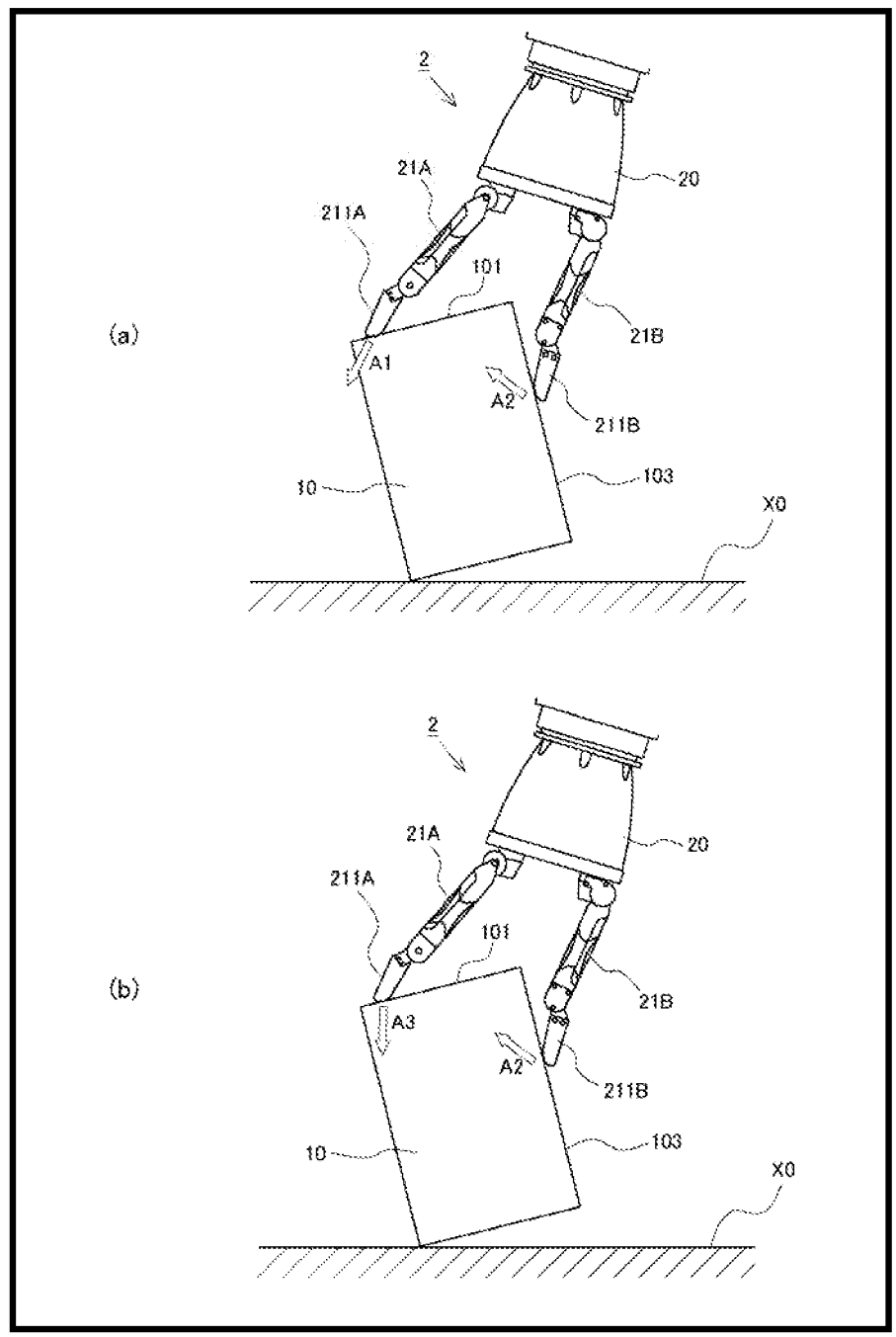

GRIPPING SYSTEM

TECHNICAL FIELD

The present invention relates to a gripping system for gripping an object using a hand mechanism having at least two finger portions.

BACKGROUND ART

Many techniques have been developed for gripping an object using an end effector, a hand mechanism, or the like simulating the structure of a human hand. For example, PTL 1 discloses a technique relating to an end effector that uses an adsorption device to adsorb an object by suction. The end effector includes three finger portions, and each finger portion rotates on its own axis by means of a plurality of actuators, while a proximal phalanx, a first middle phalanx, a second middle phalanx, and a distal phalanx are driven to rotate and perform relative bending. By driving each of the finger portions with multiple degrees of freedom in this manner, the adsorption device provided on each finger portion can be brought close to an object in a normal direction of a surface of the object, whereupon a suction effect generated by the adsorption device can be applied to the object.

PTL 2 likewise discloses an end effector having three finger portions, wherein an object is gripped using two or three of the finger portions. For example, FIG. 24 of PTL 2 shows a gripping style in which a key is clamped between two finger portions, while FIG. 29 shows a gripping style in which a ball is gripped by three finger portions. PTL 2 also discloses a technique for gripping a comparatively flat object using two finger portions cooperatively. For example, in a gripping style illustrated in FIGS. 30A and 30B, a key placed on a flat surface is gripped by clamping side edges of the key, then pivoting the key so that the key stands upright while trapping one of the side edges between a plate member and a pad, and then clamping the key between end surfaces of the two finger portions.

CITATION LIST

Patent Literature

Patent Literature 1: Japanese Patent No. 5525587
Patent Literature 2: Japanese Translation of PCT International Application Publication No. 2015-533669

SUMMARY OF INVENTION

Technical Problem

When an attempt is made to grip an object using a hand mechanism, the finger portions of the hand mechanism must be disposed relative to the object so that the object can be clamped therebetween. Therefore, when there is no space around the object to dispose the finger portions or a predetermined surface of the object, i.e. a surface of the object that is contacted by the finger portions in order to grip the object using the finger portions, is not exposed, it is difficult to grip the object using the hand mechanism. For example, when a plurality of objects of an identical type are disposed side by side in a container or the like, and in this state, an attempt is made to grip the objects one at a time, an adjacent object, the container, or the like may cause an obstruction, making it difficult to grip the object using a hand mechanism.

Conventionally in such cases, a gripping device having an adsorption device that suctions the object over a wide range is used. When this type of adsorption device is used, however, the adsorption device must be prepared in accordance with the shape, structure, and so on of the object so that the suction force of the device is exerted appropriately on the object, resulting in a large reduction in versatility as an object gripping system. Moreover, depending on the surface material and shape of the object, it may be difficult to apply the suction force generated by the adsorption device and suction marks may be left. At present, therefore, a highly versatile gripping system is yet to be provided.

The present invention has been designed in consideration of the problems described above, and an object thereof is to provide a highly versatile gripping system that makes an object grippable without being affected, as far as is possible, by the conditions in which the object is disposed.

Solution to Problem

To solve the problems described above, the present invention focuses on an unexposed portion of the surfaces of an object serving as a gripping target, the unexposed portion being unexposed so that finger portions of a hand mechanism used to grip the object cannot be brought into contact therewith. By controlling the hand mechanism to alter the position or the attitude of the object, thereby exposing the unexposed portion so that the unexposed portion can be contacted by the hand mechanism, and then grip the object in this state, gripping can be realized while reducing the effect of the conditions in which the object is disposed.

More specifically, the present invention is a gripping system for gripping an object using a hand mechanism having at least two finger portions, including a determination unit configured to determine whether or not a predetermined gripping portion, with which the finger portions of the hand mechanism are brought into contact when the object is to be gripped, is exposed; a specification unit configured to specify a contactable portion and an unexposed portion when the determination unit determines that the predetermined gripping portion is not exposed, the contactable portion being a portion of the object that can be contacted by at least a first finger portion constituting one of the finger portions and the unexposed portion being a portion that is not exposed at the time of the determination by the determination unit and therefore not contactable by either the first finger portion or a second finger portion that differs from the first finger portion; a first operation control unit configured to expose the unexposed portion of the object so that the first finger portion or the second finger portion can contact the unexposed portion by altering a position or an attitude of the object while causing the first finger portion to contact the contactable portion; and a second operation control unit configured to grip the object in a state where the unexposed portion has been exposed by the first operation control unit by bringing the first finger portion or the second finger portion into contact with the unexposed portion and bringing a finger portion other than the finger portion contacting the unexposed portion into contact with a predetermined surface of the object other than the unexposed portion.

The gripping system according to the present invention is a system for gripping an object using a hand mechanism having at least two finger portions. Here, the finger portions of the hand mechanism may be formed to have different configurations (positions and numbers of joints, shapes and numbers of link mechanisms or the like forming the finger portions, and so on). Alternatively, some or all of the finger portions may be formed to have identical configurations. Moreover, known actuators may be employed as actuators for driving the respective finger portions.

Here, in the gripping system described above, the determination unit determines whether or not the predetermined gripping portion exists. The predetermined gripping portion is a site on a surface of the object that enables gripping by the finger portions of the hand mechanism. Therefore, when the predetermined gripping portion of the object is exposed, this means that the object can be gripped by bringing the finger portions of the hand mechanism into contact with the predetermined gripping portion of the object. Gripping using the predetermined gripping portion in this manner will be referred to hereafter as "direct gripping". Hence, in this case, the hand mechanism can grip the object using the finger portions thereof without altering the position or attitude of the object. Note that the predetermined gripping portion is a site on the surface of the object that enables gripping by the finger portions of the hand mechanism from a pair of directions. Here, the "pair of directions" are two directions in which the object is contacted, and to ensure that the object is gripped with stability, the two directions preferably oppose each other by 180 degrees. Alternatively, however, the directions in which the object is contacted may be shifted as appropriate, providing that the object can still be gripped.

When it is determined that the predetermined gripping portion of the object is not exposed, on the other hand, this means that it is difficult for the hand mechanism to perform direct gripping on the object, as described above. In this case, therefore, the specification unit executes processing to specify the contactable portion and the unexposed portion. The contactable portion is a site on a surface of the object that is exposed and is therefore contactable by the first finger portion of the hand mechanism. Further, the unexposed portion is a site, among the surfaces of the object, that is not exposed at the time of the determination by the determination unit and therefore not contactable by the first or second finger portion of the hand mechanism but can be used by the finger portions of the hand mechanism to grip the object. In other words, the unexposed portion is a site that can be used to grip the object once the unexposed state thereof is eliminated so that the unexposed portion can be contacted by the finger portions of the hand mechanism. Note that the specification unit can specify the contactable portion and the unexposed portion using information relating to the shape and dimensions of the object, information relating to the manner in which the object is arranged, information relating to the surroundings of the object, and so on. Furthermore, this information may be either provided to the gripping system in advance or acquired using an imaging result acquired by an imaging device such as a camera.

Once the specification unit has specified the contactable portion and the unexposed portion, the first operation control unit brings the first finger portion into contact with the contactable portion and alters the position or attitude of the object using the resulting contact state, and as a result, the unexposed portion is exposed. By tilting, positionally shifting, or rotating the object using the first operation control unit, the unexposed portion, which was not contactable by the first or second finger portion of the hand mechanism, is exposed so as to become contactable by the first or second finger portion. Accordingly, in a state where the unexposed portion is exposed, the second operation control unit brings the first or second finger portion into contact with the unexposed portion and brings a finger portion other than the finger portion contacting the unexposed portion into contact with the predetermined surface. As a result, the object can be gripped by two finger portions of the hand mechanism via the unexposed portion and the predetermined surface. Note that the predetermined surface may be any surface of the object other than the unexposed portion, for example a surface of the object substantially opposing the unexposed portion. Alternatively, the predetermined surface may be the aforesaid contactable portion. Further, the finger portion that contacts the predetermined surface may either be a finger portion (a third finger portion) that differs from the first and second finger portions or the first finger portion itself. In the latter case, the contactable portion contacted by the first finger portion corresponds to the predetermined surface.

With the gripping system according to the present invention, described above, when the state in which the object is disposed makes direct gripping difficult, the position or attitude of the object is altered by the first operation control unit in order to expose the unexposed portion, and as a result, the object to be gripped is gripped using the unexposed portion that has been shifted to an exposed state. In other words, stable gripping of the object is made possible by shifting the object to a grippable position or attitude so as to expose the unexposed portion. By employing this configuration, effects caused by the conditions in which the object is disposed prior to being gripped can essentially be eliminated, and therefore the object can be gripped with stability. As a result, an extremely versatile gripping system can be realized.

Advantageous Effects of Invention

An object is made grippable without being affected, as far as is possible, by the conditions in which the object is disposed.

BRIEF DESCRIPTION OF DRAWINGS

FIG. 1 is a schematic view showing a configuration of a robot arm according to an embodiment.

FIG. 2 is a perspective view of a hand mechanism according to this embodiment.

FIG. 3 is a top view of the hand mechanism according to this embodiment.

FIG. 4 is a side view of a finger portion of the hand mechanism according to this embodiment.

FIG. 5 is a view showing a tip end portion side of the finger portion of the hand mechanism according to this embodiment from the direction of an arrow A in FIG. 4.

FIG. 6 is a view showing an internal structure of a part of a base portion near a connecting portion connected to the finger portion and internal structures of a base end portion and a second joint portion of the finger portion on the hand mechanism according to this embodiment.

FIG. 7 is a view showing a movement range of the second joint portion of the finger portion on the hand mechanism according to this embodiment.

FIG. 8 is a view showing internal structures of a first joint portion and a second finger link portion of the finger portion on the hand mechanism according to this embodiment.

FIG. 9 is a view showing a movement range of the first joint portion of the finger portion on the hand mechanism according to this embodiment.

FIG. 10 is a view showing an arrangement of pressure sensors on a tip end side of a first finger link portion of the finger portion on the hand mechanism according to this embodiment.

FIG. 11 is a block diagram showing respective function units included in a control device according to this embodiment.

FIG. 12 is a flowchart of gripping control executed by a hand system according to this embodiment.

FIG. 13 is a view showing direct gripping performed by the hand mechanism according to this embodiment.

FIG. 14 is a flowchart of processing for specifying a contactable portion, performed during the gripping control shown in FIG. 12.

FIG. 15 is a view showing an example of a disposal state of an object serving as a gripping target.

FIG. 16 is a flowchart of processing for specifying an unexposed portion, performed during the gripping control shown in FIG. 12.

FIG. 17A is a first view illustrating tilt gripping performed by a hand mechanism according to a first embodiment.

FIG. 17B is a second view illustrating the tilt gripping performed by the hand mechanism according to the first embodiment.

FIG. 18A is a third view illustrating the tilt gripping performed by the hand mechanism according to the first embodiment.

FIG. 18B is a fourth view illustrating the tilt gripping performed by the hand mechanism according to the first embodiment.

FIG. 18C is a fifth view illustrating the tilt gripping performed by the hand mechanism according to the first embodiment.

FIG. 19 is a view illustrating tilt gripping performed by a hand mechanism according to a first modified example of the first embodiment.

FIG. 20 is a view illustrating tilt gripping performed by a hand mechanism according to a second modified example of the first embodiment.

FIG. 21 is a first view illustrating tilt gripping performed by a hand mechanism according to a second embodiment.

FIG. 22 is a second view illustrating the tilt gripping performed by the hand mechanism according to the second embodiment.

FIG. 23 is a first view illustrating shift gripping performed by a hand mechanism according to a third embodiment.

FIG. 24 is a second view illustrating the shift gripping performed by the hand mechanism according to the third embodiment.

FIG. 25 is a view illustrating rotation gripping performed by a hand mechanism according to a fourth embodiment.

FIG. 26 is a view illustrating suspension gripping performed by a hand mechanism according to a fifth embodiment.

FIG. 27 is a first view illustrating another method of implementing the suspension gripping performed by the hand mechanism according to the fifth embodiment.

FIG. 28 is a second view illustrating the other method of implementing the suspension gripping performed by the hand mechanism according to the fifth embodiment.

FIG. 29 is a view illustrating horizontal shift gripping performed by a hand mechanism according to a sixth embodiment.

FIG. 30 is a view showing an example of a disposal state of the object to be subjected to horizontal shift gripping.

FIG. 31 is a first view illustrating horizontal shift gripping performed by a hand mechanism according to a modified example of the sixth embodiment.

FIG. 32 is a second view illustrating the horizontal shift gripping performed by the hand mechanism according to the modified example of the sixth embodiment.

DESCRIPTION OF EMBODIMENT

A specific embodiment of the present invention will be described below on the basis of the figures. Unless specified otherwise, the technical scope of the invention is not limited only to the dimensions, materials, shapes, relative arrangements, and so on of the constituent components described in these embodiments.

First Embodiment

Here, a case in which a gripping system according to the present invention is applied to a robot arm will be described. The gripping system is a system for gripping an object to be gripped using a hand mechanism 2 provided on a tip end of a robot arm 1. FIG. 1 is a schematic view showing a configuration of the robot arm 1 according to this embodiment. A robot arm 1 includes a hand mechanism 2, an arm mechanism 3, and a support portion 4. The hand mechanism 2 is attached to one end of the arm mechanism 3. Further, the other end of the arm mechanism 3 is attached to the support portion 4. The hand mechanism 2 includes a base portion 20 connected to the arm mechanism 3, and four finger portions 21 provided on the base portion 20. Note that the configuration of the hand mechanism 2 will be described in detail below.

<Arm Mechanism>

The arm mechanism 3 includes a first arm link portion 31, a second arm link portion 32, a third arm link portion 33, a fourth arm link portion 34, a fifth arm link portion 35, and a connecting member 36. The base portion 20 of the hand mechanism 2 is connected to a first joint portion 30a formed on one end side of the first arm link portion 31 of the arm mechanism 3. A motor (not shown) for rotating the hand mechanism 2 relative to the first arm link portion 31 about the first arm link portion 31 is provided in the first joint portion 30a. The other end side of the first arm link portion 31 is connected to one end side of the second arm link portion 32 by a second joint portion 30b. The first arm link portion 31 and the second arm link portion 32 are connected so that respective central axes thereof intersect perpendicularly. A motor (not shown) for rotating the first arm link portion 31 relative to the second arm link portion 32 about the other end side thereof is provided in the second joint portion 30b. Next, the other end side of the second arm link portion 32 is connected to one end side of the third arm link portion 33 by a third joint portion 30c. A motor (not shown) for rotating the second arm link portion 32 relative to the third arm link portion 33 is provided in the third joint portion 30c.

Similarly, the other end side of the third arm link portion 33 is connected to one end side of the fourth arm link portion 34 by a fourth joint portion 30d. The other end side of the fourth arm link portion 34 is connected to the fifth arm link portion 35 by a fifth joint portion 30e. A motor (not shown) for rotating the third arm link portion 33 relative to the fourth arm link portion 34 is provided in the fourth joint portion 30d. Moreover, a motor (not shown) for rotating the fourth arm link portion 34 relative to the fifth arm link portion 35 is provided in the fifth joint portion 30e. Further, the fifth arm link portion 35 is connected to the connecting member 36, which is disposed to extend vertically from the support portion 4, by a sixth joint portion 30f. The fifth arm link portion 35 and the connecting member 36 are connected so that respective central axes thereof are coaxial. A motor (not shown) for rotating the fifth arm link portion 35 about the fifth arm link portion 35 and the connecting member 36 is provided in the sixth joint portion 30f. By configuring the arm mechanism 3 in this manner, the arm mechanism 3 can be realized as a mechanism having six degrees of freedom.

<Hand Mechanism>

Next, the configuration of the hand mechanism 2 will be described on the basis of FIGS. 2 to 10. FIG. 2 is a perspective view of the hand mechanism 2, and FIG. 3 is a top view of the hand mechanism 2. As shown in FIGS. 2 and 3, in the hand mechanism 2, the four finger portions 21 are disposed on the base portion 20 at equal angular intervals (more specifically, at 90 degree intervals) on a circumference centering on a longitudinal direction (a perpendicular direction to the paper surface in FIG. 3) axis of the hand mechanism 2. Further, the four finger portions 21 all have identical structures and identical lengths. Note, however, that the operations of the respective finger portions 21 are controlled independently.

FIGS. 4 to 10 are views illustrating the configuration of one finger portion 21 of the hand mechanism 2 and a driving mechanism thereof. FIG. 4 is a side view of the finger portion 21. Note that in FIG. 4, the base portion 20 is depicted in a see-through state so that the part of the internal structure of the finger portion 21 positioned inside the base portion 20 can also be seen. Further, FIG. 5 is a view showing a tip end portion side of the finger portion 21 from the direction of an arrow A in FIG. 4.

The finger portion 21 includes a first finger link portion 211, the second finger link portion 212, and a base end portion 213. The base end portion 213 of the finger portion 21 is connected to the base portion 20. Here, as indicated by arrows in FIG. 3, the base end portion 213 is connected to the base portion 20 so as to be capable of rotating relative to the base portion 20 about a longitudinal direction (a perpendicular direction to the paper surface in FIG. 3) axis of the finger portion 21. Further, on the finger portion 21, one end of the second finger link portion 212 is connected to the base end portion 213. A second joint portion 23 is formed in a connecting portion between the second finger link portion 212 and the base end portion 213.

A driving mechanism of the base end portion 213 and a driving mechanism of the second joint portion 23 will be described on the basis of FIG. 6. FIG. 6 is a view showing an internal structure of a part of the base portion 20 near a connecting portion connected to the finger portion 21 and internal structures of the base end portion 213 and the second joint portion 23 of the finger portion 21. As shown in FIG. 6, a gear 65 connected to a rotary shaft of the base end portion 213 and a gear 66 connected to a rotary shaft of the third motor 53 are provided in the interior of the base portion 20 in order to rotate the entire finger portion 21. The gear 65 and the gear 66 are meshed to each other. With this configuration, when the third motor 53 rotates, resulting rotary force is transmitted to the rotary shaft of the base end portion 213 through the two gears 65, 66. In other words, the entire finger portion 21 can be driven to rotate by the third motor 53.

Further, a worm wheel 63 and a worm 64 meshed to the worm wheel 63 are provided in the interior of the second joint portion 23. The worm wheel 63 is connected to a rotary shaft of the second finger link portion 212 in the second joint portion 23. Furthermore, the worm 64 is connected to a rotary shaft of the second motor 52 provided in the interior of the base portion 20. With this configuration, when the second motor 52 is driven to rotate, resulting rotary force is transmitted to the rotary shaft of the second finger link portion 212 by the worm 64 and the worm wheel 63. As a result, the second finger link portion 212 is driven to rotate relative to the base end portion 213. At this time, the driving force generated by the second motor 52 and the driving force generated by the third motor 53 are transmitted to the respective operation subjects thereof independently. FIG. 7 is a view showing a movement range of the second joint portion 23 of the finger portion 21, this movement range being realized by the driving force of the second motor 52. As shown in FIG. 7, the second joint portion 23 is formed to be capable of bending and extending.

Next, in the finger portion 21, one end of the first finger link portion 211 is connected to the other end of the second finger link portion 212. A first joint portion 22 is formed in a connecting portion between the first finger link portion 211 and the second finger link portion 212. A driving mechanism of the first joint portion 22 will be described on the basis of FIG. 8. FIG. 8 is a view showing internal structures of the first joint portion 22 and the second finger link portion 212 in the finger portion 21. Intermeshed bevel gears 61, 62 fitted with each other are provided in the interior of the first joint portion 22. One of the bevel gears 61 is connected to a rotary shaft of the first finger link portion 211 within the first joint portion 22. Further, the other bevel gear 62 is connected to a rotary shaft of a first motor 51 provided in the interior of the second finger link portion 212. With this configuration, when the first motor 51 is driven to rotate, resulting rotary force is transmitted to the rotary shaft of the first finger link portion 211 by the two bevel gears 61, 62. As a result, the first finger link portion 211 is driven to rotate relative to the second finger link portion 212. Here, FIG. 9 is a view showing a movement range of the first joint portion 22 of the finger portion 21, realized by the driving force of the first motor 51. As shown in FIG. 9, the first joint portion 22 is formed to be capable of being bent and extended.

Furthermore, as shown in FIGS. 2 and 4, in this embodiment, in the finger portion 21, the second finger link portion 212 on the base portion 20 side (the base end portion 213 side) of the first joint portion 22 is longer than the first finger link portion 211 on the tip end portion side of the first joint portion 22.

Moreover, as shown in FIGS. 2, 4, 5, and 10, in this embodiment, a pressure sensor 70 is provided on the tip end side of the first finger link portion 211 of the finger portion 21. The pressure sensor 70 is a sensor for detecting external force (pressure) acting on the tip end side of the first finger link portion 211. Furthermore, as shown in FIG. 4, the pressure sensor 70 is provided on both a wall surface 215 on a bending direction side of the first joint portion 22 and a wall surface 216 on an extension direction side of the first joint portion 22 on the tip end side of the first finger link portion 211. Here, in this embodiment, a wall surface 215 on a bending direction side of the first joint portion 22 on the tip end side of the first finger link portion 211 is formed in a curved surface shape. Accordingly, as shown in FIG. 10, a plurality of pressure sensors 70 may be arranged side by side on the bending direction-side wall surface 215 of the first joint portion 22 on the tip end side of the first finger link portion 211 so as to extend along the curved surface shape thereof.

<Support Portion>

Next, configurations of an arm control device 42 and a hand control device 43 disposed in the interior of the support portion 4, the arm control device 42 serving as a control device for the robot arm 1 and the hand control device 43 serving as a control device for the hand mechanism 2, will be described on the basis of FIG. 11. FIG. 11 is a block diagram showing respective function units included in the arm control device 42 and the hand control device 43. The arm control device 42 is configured to supply control signals for generating drive signals relating to the respective motors installed in the arm mechanism 3 of the robot arm 1 to the drivers of the motors. The arm control device 42 is a computer having an arithmetic processing device and a memory, and includes, as function units, an arm control unit 420 and a motor state quantity acquisition unit 421. These function units are formed by executing a predetermined control program in the arm control device 42.

The arm control unit 420 moves the arm mechanism 3 by controlling the motors provided respectively in the joint portions 30a, 30b, 30c, 30d, 30e of the arm mechanism 3 on the basis of object information which is owned by the hand control device 43 and is acquired by an object information acquisition unit 430, which is to be described below, whereby the hand mechanism 2 is moved to a predetermined gripping position suitable for gripping an object. Further, each of the motors provided in the joint portions 30a, 30b, 30c, 30d, 30e of the arm mechanism 3 is provided with an encoder (not shown) for detecting state quantities (a rotation position and a rotation speed of the rotary shaft of the motor, and so on) relating to the rotation state of the corresponding motor. The state quantities of the motors, detected by the encoders of the respective motors, are input into the motor state quantity acquisition unit 421 of the arm control device 42. Then, on the basis of the state quantities of the respective motors, input into the motor state quantity acquisition unit 421, the arm control unit 420 servo-controls the respective motors so that the hand mechanism 2 moves to the above-mentioned predetermined gripping position, for example.

The hand control device 43 is configured to supply control signals for generating drive signals relating to the respective motors installed in the hand mechanism 2 to the drivers of the motors. The hand control device 43 is a computer having an arithmetic processing device and a memory, and includes, as function units, the object information acquisition unit 430, a motor state quantity acquisition unit 431, a sensor information acquisition unit 432, a direct gripping control unit 433, a determination unit 434, a specification unit 435, a first operation control unit 436, and a second operation control unit 437. These function units are formed by executing a predetermined control program in the hand control device 43.

The hand control device 43 is configured to control the hand mechanism 2, which has been moved to a predetermined gripping position, on the basis of object information acquired by the object information acquisition unit 430. The object information acquisition unit 430 acquires object information, which is information relating to an object to be gripped by the hand mechanism 2. Here, the object information includes information relating to the shape, dimensions, and position of the object, information indicating the surrounding environment of the object (information relating to items other than the object existing on the periphery of the object, for example information relating to the shape of a container housing the object or a row of objects in the container), and so on. The object information acquisition unit 430 may also acquire object information input by a user. Further, when a visual sensor for capturing an image that includes the object is provided, the object information acquisition unit 430 may acquire object information from an image captured by the visual sensor.

Further, the direct gripping control unit 433 is a function unit for causing the hand mechanism 2 to execute direct gripping, which is one of a plurality of object gripping styles. Direct gripping is a gripping style implemented by bringing at least two of the finger portions 21 of the hand mechanism 2 into contact with the object so that the finger portions clamp the object while leaving the object in the state in which the object was disposed before being gripped, or in other words without altering the position or attitude of the object. The direct gripping executed by the direct gripping control unit 433 will be described in detail below.

Next, the determination unit 434 is a function unit for determining whether or not the disposal state of the object to be gripped is a state permitting the direct gripping described above. Further, the specification unit 435 is a function unit for specifying a site of the object to be used to grip the object in a different style to direct gripping when the determination unit 434 determines that the object is disposed in a state not permitting direct gripping. Note that the gripping style employed in this case is a gripping style realized by the first operation control unit 436 and the second operation control unit 437, to be described below, and sites of the object used at this time include at least a contactable portion and an unexposed portion. This will be described in detail below. Further, as mentioned above, the first operation control unit 436 and the second operation control unit 437 are function units for causing the hand mechanism to execute a gripping operation in a different style to direct gripping. A second operation is executed by the second operation control unit following a first operation executed by the first operation control unit 436. The first operation and the second operation will be described in detail below.

In the hand control device 43, during both the direct gripping described above and gipping in a different style to direct gripping, the first motor 51, the second motor 52, and the third motor 53 that drive the respective finger portions 21 of the hand mechanism 2 in order to grip the object are controlled on the basis of the object information. Moreover, each first motor 51, each second motor 52, and each third motor 53 of the hand mechanism 2 is provided with an encoder (not shown) for detecting state quantities (the rotation position and rotation speed of the rotary shaft of the motor, and so on) relating to the rotation state of the corresponding motor. State quantities of the respective motors 51, 52, 53, detected by encoders of the motors 51, 52, 53, are input into the motor state quantity acquisition unit 431. The hand control device 43 then grips the object by servo-controlling the motors 51, 52, 53 of the respective finger portions 21 on the basis of the state quantities of the respective motors 51, 52, 53, input into the motor state quantity acquisition unit 431.

Furthermore, in the hand control device 43, detection values from the pressure sensors 70 provided on the tip end side of each finger portion 21 of the hand mechanism 2 are input into the sensor information acquisition unit 432. On the basis of the detection values from the pressure sensors 70 on the respective finger portions 21, acquired by the sensor information acquisition unit 432, the hand control device 43 can detect contact with the object by the finger portions 21, and on the basis of corresponding detection signals, the hand control device 43 can also control the motors 51, 52, 53 of the finger portions 21.

Note that in the example shown in FIGS. 1 and 11, the arm control device 42 and the hand control device 43 are disposed in the interior of the support portion 4 as a control device included in the gripping system, but the arm control device 42 and the hand control device 43 may be formed by causing a control device such as a computer disposed on the exterior of the robot arm 1 to execute a control program. At this time, a configuration in which the respective function units of the arm control device 42 and the hand control device 43 are formed in a single control device in which the two devices are integrated may also be employed. A configuration in which some of the respective function units of the arm control device 42 or the hand control device 43 are formed in a separate control device to the arm control device 42 and the hand control device 43 may also be employed. Note that even when the control device included in the gripping system is separated into the arm control device 42 and the hand control device 43, the respective function units shown in FIG. 11 may substantially be formed in either of the control devices, providing no technical discrepancies occur as a result, and if necessary, information may be exchanged as appropriate between the arm control device 42 and the hand control device 43.

<Gripping Control>

Here, control executed by the gripping system to grip an object using the hand mechanism 2 installed on the robot arm 1 will be described on the basis of FIG. 12. This gripping control is realized by executing a predetermined control program in the arm control device 42 and the hand control device 43. First, in S101, the hand mechanism 2 is moved to a predetermined gripping position. This processing is executed by the arm control unit 420 of the arm control device 42. More specifically, the object information acquired by the object information acquisition unit 430 is transmitted from the hand control device 43 to the arm control device 42. The predetermined gripping position in which to position the hand mechanism 2, or in other words a position in which the object can be gripped when the hand mechanism 2 performs an action on the object, is then calculated on the basis of the transmitted object information. For example, using information indicating the position of the object, which is included in the object information, as a reference, a position that is removed from the object by a predetermined distance in order to enable gripping of the object may be calculated as the predetermined gripping position. When the processing of S101 is complete, the control advances to S102.

In S102, a determination is made as to whether or not the hand mechanism 2 moved to the predetermined gripping position can directly grip the object. This determination is performed by the determination unit 434 described above. Direct gripping by the hand mechanism 2 will be described in detail here on the basis of FIG. 13. An object 10 shown in FIG. 13 is placed alone on a floor surface and has a rectangular parallelepiped shape. As shown in FIG. 13, an end surface 10a of the object 10 and an end surface 10b opposing the end surface 10a are both exposed to an extent to be contactable by the finger portions 21 of the hand mechanism 2. Note that in the present application, when the four finger portions 21 of the hand mechanism 2 and the first finger link portions 211 constituting the finger portions 21 are to be identified separately for each finger portion, identification affixes "A" to "D" will be attached to the reference numerals "21" and "211", and when there is no need to distinguish therebetween, the affixes will be omitted. Further, the affixes "A" to "D" are allocated to the respective finger portions in clockwise order when the finger portions 21 are arranged in the state shown in FIG. 3. Here, in the object 10, the end surface 10a and the end surface 10b are exposed, and therefore the finger portion 21A and the finger portion 21C of the hand mechanism 2 can clamp and grip the object 10 from a pair of directions indicated by black-outlined arrows in the figure. At this time, the object 10 can be gripped without altering the position or attitude of the object 10, and therefore the gripping style shown in FIG. 13 is direct gripping.

Furthermore, the determination by the determination unit 434 as to whether or not direct gripping is possible constitutes determination processing for determining whether or not sites of the object 10 (corresponding to a predetermined gripping portion of the present invention, the end surfaces 10a, 10b shown in FIG. 13 being examples thereof) by which the object 10 can be clamped and gripped from a pair of directions, as described above, are exposed. For example, the existence of sites permitting direct gripping is determined in accordance with information relating to the shape and position of the object and environment information indicating obstructions on the periphery of the object 10, relative positional relationships with the object 10, and so on, this information being included in the object information acquired by the object information acquisition unit 430. In the example shown in FIG. 13, the determination unit 434 determines that direct gripping is possible by confirming the existence of the end surface 10a and the end surface 10b, which are positioned on the side face sides of the rectangular parallelepiped-shaped object 10 and have sufficient space on the periphery thereof to allow the finger portion 21A and the finger portion 21C to approach, on the basis of object information indicating that the object 10 is disposed on a floor surface. When the determination of S102 is affirmative, the control advances to S103, and when the determination is negative, the control advances to S104.

In S103, in response to the affirmative determination in S102, direct gripping is implemented by the hand mechanism 2. For example, in the embodiment shown in FIG. 13, direct gripping is performed on the object 10 by bringing the first finger link portion 211A of the finger portion 21A into contact with the end surface 10a and bringing the first finger link portion 211C of the finger portion 21C into contact with the end surface 10b. Note that during direct gripping, the object 10 should be gripped by at least two finger portions 21, but the object 10 may be gripped with greater stability by bringing more finger portions 21 into contact with the object 10. For example, in the embodiment shown in FIG. 13, direct gripping may be implemented by bringing the first finger link portion 211B of the finger portion 21B and the first finger link portion 211D of the finger portion 21D, not shown in the figure, into contact with the object 10. Following the processing of S103, the control is terminated.

Next, in S104, in response to the negative determination in S102, a contactable portion of the object 10 is specified. The contactable portion is a site among the surfaces of the object 10, the object 10 being disposed in a state not permitting direct gripping, that can be contacted by any of the finger portions (a finger portion corresponding to a first finger portion of the present invention) of the hand mechanism 2 so as to tilt the object 10 in order to realize gripping in a different style to direct gripping. Hence, the contactable portion does not correspond to all of the exposed surfaces of the object 10 but a site, among the exposed surfaces, that a finger portion can contact in order to alter the attitude or position of the object 10. Processing for specifying the contactable portion of the object 10 will be described here on the basis of FIG. 14.

<Contactable Portion Specification Processing>

FIG. 14 is a flowchart of processing for specifying the contactable portion of the object 10. Note that in the description of this processing, it is assumed that the object 10 serving as the gripping target is disposed as shown in FIG. 15. In this disposal state, four rectangular parallelepiped-shaped items serving as objects are arranged side by side, and the item positioned on the front side thereof is the object 10 that serves as the gripping target. The other items will be referred to as non-objects 10' that are shaped identically to the object 10 but are not gripping targets. In the disposal state shown in FIG. 15, a bottom surface of the object 10 is disposed in contact with a floor surface, and since an obstruction, not shown in the figure (a container housing the items or the like, for example), is positioned on the periphery of the object 10, side faces S2 and S3 of the object 10 are not in an exposed state. Further, a back surface S5 of the object 10 is in contact with the non-object 10' on the back portion thereof and is therefore likewise not in an exposed state. Note that information relating to the disposal state of the object 10 is included in the object information acquired by the object information acquisition unit 430.

Here, in S201, exposed surfaces of the object 10 are extracted on the basis of the object information relating to the object 10. In the example shown in FIG. 15, a front surface S1 and an upper surface S4 are extracted as the exposed surfaces of the object 10. The extracted exposed surfaces serve as so-called contactable portion candidates. Next, in S202, an exposed surface on which a tilting operation (see FIG. 17B, to be described below), in which a finger portion 21 of the hand mechanism 2 contacts and performs an action on the object so as to tilt the object 10, can be performed is selected from the exposed surfaces extracted in S201. In the example shown in FIG. 15, the front surface S1 stands substantially vertically upright from the floor surface, and therefore, even when the finger portion 21 contacts and exerts force on the front surface S1, the object 10 cannot be tilted due to the existence of the non-object 10' and the obstruction positioned on the periphery of the object 10. As regards the upper surface S4, however, by bringing a finger portion 21 into contact with the upper surface S4 and moving the finger portion 21 in this state so as to pull the upper portion of the object 10 over toward the front side, a tilting operation can be realized on the object 10. Hence, in the processing of S202, the upper surface S4 is selected as the contactable portion candidate.

Next, in S203, a determination is made as to whether or not a candidate exposed surface has been found in the processing of S201 and S202. When the determination of S203 is affirmative, one of the exposed surfaces narrowed down as contactable portion candidates is specified as the contactable portion (processing of S204). When, on the other hand, the determination of S203 is negative, a contactable portion is not specified, and the control ends unsuccessfully. Hence, by executing the contactable portion specification processing shown in FIG. 14, a contactable portion to be used during the gripping control is specified (the processing of S104 in FIG. 12). Note that in this embodiment, the upper surface S4 is specified as the contactable portion.

Here, returning to FIG. 12, when the processing of S104 is complete, an unexposed portion of the object 10 is specified in S105. The unexposed portion is a site, among the surfaces of the object 10, that is not exposed and therefore not contactable by the finger portions of the hand mechanism 2 before the object 10 is tilted with a finger portion 21 contacting the contactable portion, as described above, but is removed from its unexposed state when the tilting operation is performed. It may therefore be said that the contactable portion and the unexposed portion are sites, among the surfaces of the object 10, that are associated by the tilting operation performed on the object 10. Accordingly, processing for specifying the unexposed portion of the object 10 will now be described on the basis of FIG. 16.

<Unexposed Portion Specification Processing>

FIG. 16 is a flowchart of processing for specifying the unexposed portion of the object 10. Note that in the description of this processing, it is assumed that the object 10 serving as the gripping target is disposed as shown in FIG. 15, and that a tilting operation is to be performed on the object 10 using the contactable portion described above. Further, likewise in this processing, similarly to the processing for specifying the contactable portion, the object information relating to the object 10 is used. First, in S301, sites among the surfaces of the object 10 that form unexposed portion candidates are extracted on the basis of the object information relating to the object 10. The sites serving as the unexposed portion candidates are extracted on condition that the site is not exposed and therefore not contactable by the finger portions 21 of the hand mechanism 2. In the object 10 in the disposal state shown in FIG. 15, therefore, the side faces S2 and S3, the back surface S5, and the bottom surface are extracted as unexposed portion candidates.

Next, in S302, sites that are exposed when the tilting operation is performed on the object 10 using the contactable portion, as described above, or in other words sites that become contactable by the finger portions 21 of the hand mechanism 2 when the tilting operation is performed, are selected as unexposed portion candidates from the sites extracted in S301. In the example shown in FIG. 15, the only tilting operation that can be performed on the object 10 is an operation for pulling the object 10 over toward the front side in a state where the finger portion 21 contacts the upper surface S4. Accordingly, the only unexposed portion candidate that is exposed by the tilting operation is the back surface S5.

Next, in S303, processing for selecting a further unexposed portion candidate is performed. More specifically, an exposed site that forms a pair with the candidate unexposed portion and that can be contacted by another finger portion 21 when a finger portion 21 contacts the candidate unexposed portion so that the object 10 can be gripped by the pair of sites, or in other words a candidate unexposed portion having a surface that can be contacted by a finger portion 21, is selected from the unexposed portion candidates selected in S302 as an unexposed portion candidate. In other words, in S303, an unexposed portion that forms an exposed site in which a finger portion 21 can contact the object 10 when the object 10 is gripped using the unexposed portion exposed by the tilting operation is selected in addition to the unexposed portion exposed by the tilting operation. Note that the exposed site that forms a pair with the unexposed portion in this manner corresponds to a predetermined surface of the present invention. In the example shown in FIG. 15, the back surface S5 is the only unexposed portion candidate selected in S302, but by bringing a finger portion 21 into contact with the front surface S1 when another finger portion 21 has been brought into contact with the back surface S5 exposed by the tilting operation, the object 10 can be gripped by the two finger portions. Therefore, the back surface S5 is also selected as the unexposed portion candidate in the processing of S303.

In S304, a determination is made as to whether or not candidate unexposed portions have been found in the processing of S301 to S303. When the determination of S304 is affirmative, one site is specified from the unexposed portion candidates as the unexposed portion (processing of S305). When, on the other hand, the determination of S304 is negative, an unexposed portion is not specified, and the control ends unsuccessfully. Hence, by executing the unexposed portion specification processing shown in FIG. 16, an unexposed portion to be used during the gripping control is specified (the processing of S105 in FIG. 12). Note that in this embodiment, the back surface S5 is specified as the unexposed portion.

Here, returning to FIG. 12, when the processing of S105 is complete, a determination is made in S106 as to whether or not the contactable portion and the unexposed portion have been specified successfully. More specifically, when the contactable portion has been specified successfully by the contactable portion specification processing and the unexposed portion has been specified successfully by the unexposed portion specification processing, the determination processing of S106 results in an affirmative determination, and in all other cases, the determination processing of S106 results in a negative determination. When the determination of S106 is affirmative, the object 10 is gripped using the specified contactable portion and unexposed portion, and when the determination of S106 is negative, the processing for gripping the object 10 is halted (processing of S111). Note that when the processing for gripping the object 10 is halted, the robot arm 1 and the hand mechanism 2 may perform predetermined operations other than a gripping operation. For example, the robot arm 1 and the hand mechanism 2 may be returned to predetermined positions and states, whereupon an alarm notifying a user that the object 10 has not been gripped may be issued. Alternatively, the item serving as the gripping target may be switched to another item and the gripping control may proceed in relation thereto.

Here, the gripping processing performed on the object 10 when the determination of S106 is affirmative will now be described. First, in S107, an operation for tilting the object 10 using the contactable portion is started. The tilting operation is an operation for exposing the unexposed portion to an extent that allows the finger portions 21 of the hand mechanism 2 to contact the unexposed portion, and corresponds to the first operation executed by the first operation control unit 436. More specifically, to describe the operation on the basis of FIGS. 17A and 17B, the first operation control unit 436 brings the first finger link portion 211A of the finger portion 21A into contact with the upper surface serving as a contactable portion 101 of the object 10. At this time, the other finger portions 21B to 21D do not contact the object 10. Then, while maintaining contact between the finger portion 21A and the contactable portion 101, the first operation control unit 436 drive-controls the finger portion 21A to exert force on the object 10 for pulling the object 10 over toward the front side. Accordingly, as shown in FIG. 17B, an upper portion of the object 10 is gradually tilted so as to approach the floor surface side about a part of the bottom surface contacting the floor surface.

As a result of the tilting operation, an unexposed portion 102, i.e. the back surface of the object 10 that was in contact with the non-object 10' in the pre-gripping disposal state, is gradually exposed so that a space gradually forms between the unexposed portion 102 and the non-object 10'. This space gradually increases as tilting of the object 10 progresses. Hence, in S108, a determination is made in relation to the tilting operation started on the object 10 in S107 as to whether or not exposure of the unexposed portion 102 is complete, or in other words whether or not the space formed between the unexposed portion 102 and the non-object 10' is large enough for the finger portion 21B and the finger portion 21D of the hand mechanism 2, i.e. different finger portions to the finger portion 21A, to be inserted therein. Note that this determination is made on the basis of a movement amount of the finger portion 21A, which is related to the amount by which the object 10 is pulled over. A space that is large enough for the finger portion 21B and the finger portion 21D to be inserted therein will be referred to hereafter as an insertion space. When the determination of S108 is affirmative, the control advances to S109, and when the determination is negative, the operation to tilt the object 10 is continued.

Next, in S109, the tilting operation by the first operation control unit 436 is stopped in response to the affirmative determination in S108. At this time, the state of contact between the finger portion 21A and the contactable portion 101 is maintained. Accordingly, the unexposed portion 102 is sufficiently exposed, and the insertion space is secured between the tilted object 10 and the adjacent non-object 10'. Next, in S110, a gripping operation is performed on the object 10. This gripping operation is a gripping style performed in a state where the attitude of the object 10 prior to the start of gripping control has been altered by the tilting operation described above, and differs from the direct gripping shown in FIG. 13. In the present application, therefore, the gripping operation performed in S110 will be referred to as tilt gripping.

Tilt gripping is gripping performed on the object in a state where the object 10 has been tilted so that the unexposed portion 102 is exposed, and corresponds to the second operation executed by the second operation control unit 437. Tilt gripping will now be described more specifically on the basis of FIGS. 18A to 18C. Note that FIGS. 18A to 18C show an identical state, in which the hand mechanism 2 grips the object by tilt gripping, from different viewpoints. FIG. 18A is a view from a direction in which the unexposed portion 102 of the object 10 is visible, FIG. 18B is a view showing the object 10 from the side, and FIG. 18C is a view from a direction in which a front surface 103 (a site corresponding to the front surface S1 in FIG. 15) of the object is visible.

In tilt gripping, the first finger link portion 211B of the finger portion 21B and the first finger link portion 211D of the finger portion 21D are inserted into the insertion space formed between the object 10 and the adjacent non-object 10' so that the two finger link portions contact the unexposed portion 102, and the first finger link portion 211C of the finger portion 21C is brought into contact with the front surface 103 of the object 10. In other words, during tilt gripping, the tilted object 10 is gripped with stability from the front and rear thereof using finger portions of the hand mechanism 2 other than the finger portion 21A used to support the tilted state. In this case, therefore, the finger portion 21B and the finger portion 21D correspond to a second finger portion of the present invention, while the finger portion 21C corresponds to a third finger portion. Alternatively, the first finger link portion of one finger portion 21 may be brought into contact with the unexposed portion 102 and the first finger link portions of the remaining two finger portions 21 may be brought into contact with the front surface 103.

Furthermore, as shown in FIG. 18B, to grip the object with greater stability during tilt gripping, the first finger link portion of the finger portion 21 on the unexposed portion 102 side and the first finger link portion of the finger portion 21 on the front surface 103 side preferably substantially face each other when the object 10 is seen from the side. Moreover, as shown in FIGS. 18A to 18C, when tilt gripping is performed using three finger portions 21, the respective finger portions 21 preferably contact the object so that from the unexposed portion 102 or the front surface 103, an action point of one finger portion, namely the finger portion 21C, is positioned between respective action points of two finger portions, namely the finger portions 21B and 21D.

Once tilt gripping has been performed on the object in S110, the hand mechanism 2 can move the object 10 to a desired position while gripping the object 10. At this point, the gripping control shown in FIG. 12 is complete. Hence, according to this gripping control, when the object 10 is disposed such that direct gripping is possible, direct gripping is executed. As a result, the time required to grip the object 10 can be shortened. When, on the other hand, the object 10 is disposed such that direct gripping is not possible, the attitude of the object 10 is altered by bringing the finger portion 21A of the hand mechanism 2 into contact with the contactable portion 101, whereupon tilt gripping is realized on the object 10 by the remaining finger portions 21B to 21D. During tilt gripping, the object 10 is gripped while keeping the finger portion 21A in contact therewith, and therefore the time required to realize a state in which tilt gripping can be performed on the object 10 can be minimized. Hence, with the tilt gripping described above, the object 10 can be gripped without being affected, as far as is possible, by the conditions in which the object 10 is disposed. As a result, the object can be gripped with an extremely high degree of efficiency and moved after being gripped.

First Modified Example

A first modified example of the hand mechanism 2 included in the above gripping system will now be described on the basis of FIG. 19. Note that to simplify the description, FIG. 19 shows only the finger portion 21A and the finger portion 21C, and the other finger portions 21B, 21D are omitted. In the first embodiment described above, when the object is tilted while the first finger link portion 211A of the finger portion 21A contacts the upper surface serving as the contactable portion 101 of the object 10, the finger portions 21B to 21D other than the finger portion 21A do not contact the object 10, but instead, when the object is tilted while the first finger link portion 211A of the finger portion 21A contacts the upper surface serving as the contactable portion 101 of the object 10, the first finger link portion 211C of the finger portion 21C may be brought into contact with a lower portion of the front surface 103 of the object 10 so that the object 10 is tilted using the contacted part as a fulcrum. Note that the position on the front surface 103 of the object 10 that is contacted by the first finger link portion 211C of the finger portion 21C is set to be closer to the bottom surface of the object 10 than the upper surface in a height direction of the object 10 and to be identical to the position contacted by the first finger link portion 211A of the finger portion 21A in a width direction (a front-rear direction in FIG. 19) of the object 10. According to this modified example, it is possible to suppress positional deviation in a site (the site contacted by the finger portion 21A) that serves as the point where force is applied when the object 10 is tilted and positional deviation in a site (the site contacted by the finger portion 21C) that serves as the fulcrum about which the object 10 is tilted, and therefore the attitude of the object 10 can easily be set in a suitable attitude for gripping. As a result, the object 10 can be gripped in a more stable attitude.

Second Modified Example

A second modified example of the hand mechanism 2 included in the above gripping system will now be described on the basis of FIG. 20. The hand mechanism 2 according to this modified example includes three finger portions 21A to 21C. The finger portions have identical configurations, similarly to the embodiment described above, and when the hand mechanism 2 is seen from above, as shown in FIG. 3, the finger portions 21 are disposed at equal angular intervals (i.e., 120 degree intervals) on a circumference centering on a longitudinal direction axis of the hand mechanism 2. In this case, the object is tilted by bringing the first finger link portion 211B of the finger portion 21B, which corresponds to the first finger portion, into contact with the contactable portion 101 of the object 10. Then, with respect to the tilted object 10, the first finger link portion 211A of the finger portion 21A, which corresponds to the second finger portion, contacts the unexposed portion 102, and the first finger link portion 211C of the finger portion 21C, which corresponds to the third finger portion, contacts the front surface 103.

Further, in the gripping control described above, a determination is made as to whether or not direct gripping is possible, and when it is determined that direct gripping is not possible, gripping is performed after altering the attitude of the gripping target, but instead, attitude alteration and gripping of the gripping target may be implemented without performing this determination processing. In this case, the gripping system is a gripping system for gripping an object using a hand mechanism having at least two finger portions, including a specification unit that specifies a contactable portion and an unexposed portion, the contactable portion being a portion of the object that can be contacted by at least a first finger portion constituting one of the finger portions and the unexposed portion being a portion that is not exposed at the time of the determination by the determination unit and therefore not contactable by a second finger portion that differs from the first finger portion, a first operation control unit that exposes the unexposed portion of the object so that the second finger portion can contact the unexposed portion by altering the position or the attitude of the object while causing the first finger portion to contact the contactable portion, and a second operation control unit that grips the object in a state where the unexposed portion has been exposed by the first operation control unit by bringing the second finger portion into contact with the unexposed portion and bringing a finger portion other than the second finger portion into contact with a predetermined surface of the object other than the unexposed portion.

Second Embodiment

A gripping system according to a second embodiment will now be described on the basis of FIGS. 21 and 22. To simplify the description, the finger portion 21D has been omitted from these two figures. In this embodiment, the rectangular parallelepiped-shaped object 10 is disposed on a floor surface, but a non-object 10' is disposed beside the object 10. At this time, the object 10 and the non-object 10' are not in contact, and a comparatively small interval R1 is formed therebetween. In this embodiment, however, the interval R1 is not large enough to insert a finger portion (the finger portion 21C, for example) of the hand mechanism 2 in order to directly grip the object 10. Moreover, an obstruction, not shown in the figures, exists on the sides (the front and rear sides in the figures) of the object 10, and therefore the object 10 cannot be moved in the corresponding direction. In this case, the determination unit 434 determines that the object 10 cannot be directly gripped. Note that this determination is made on the basis of the object information acquired by the object information acquisition unit 430.

In this case, tilt gripping is performed on the object 10 using the gripping control shown in FIG. 12. As shown in FIG. 21, when the hand mechanism 2 approaches the object 10 from above, the upper surface of the object 10 can be contacted by the finger portions 21 of the hand mechanism 2, and therefore, by pushing down an edge portion of the upper surface in the direction (diagonally downward and to the right) of a black-outlined arrow in the figure using a finger portion 21, the object 10 can be tilted while a part of the bottom surface thereof remains in contact with the floor surface (see FIG. 22). Accordingly, in the contactable portion specification processing of FIG. 14, the upper surface of the object 10 is selected as the contactable portion 101.

Further, when the object 10 is tilted in this manner, the side face of the object 10 that opposes the non-object 10', i.e., the side face that was not exposed and therefore not contactable by the finger portions 21 before the object 10 was tilted, is exposed so as to become contactable. Therefore, a finger portion 21 can be brought into contact with the exposed side face, and tilt gripping can be implemented on the object 10 using this finger portion and the finger portion contacting the contactable portion 101, as shown in FIG. 22. Accordingly, the side face of the object 10 is selected as the unexposed portion 102 in the unexposed portion specification processing shown in FIG. 16. Note that at this time, the upper surface of the object 10 (the contactable portion 101) serves as the exposed site that forms a pair with the unexposed portion 102 to allow tilt gripping to be performed on the object 10, or in other words the site that corresponds to the predetermined surface of the present invention.

Once the contactable portion 101 and the unexposed portion 102 have been specified in this manner, as the first operation, the first finger link portion 211A of the finger portion 21A is brought into contact with the edge portion of the contactable portion 101 and force is applied in the direction of the black-outlined arrow in FIG. 21. As a result, the object 10 is tilted and the unexposed portion 102 is exposed and is therefore contactable by the first finger link portion 211C of the finger portion 21C. The object 10 is then maintained in this tilted state. Next, as the second operation, the first finger link portion 211C of the finger portion 21C is brought into contact with the unexposed portion 102 of the tilted object 10. Tilt gripping is then performed by clamping the object 10 between the first finger link portion 211C of the finger portion 21C and the first finger link portion 211A of the finger portion 21A already contacting the contactable portion 101. Note that at this time, in order to grip the object 10 with greater stability, another finger portion (the finger portion 21B, for example) of the hand mechanism 2 may also be brought into contact with a contactable site of the object 10. Likewise according to this embodiment, the object 10 can be gripped without being affected, as far as is possible, by the conditions in which the object 10 is disposed. As a result, the object can be gripped with an extremely high degree of efficiency and moved after being gripped.

Third Embodiment

A gripping system according to a third embodiment will now be described on the basis of FIGS. 23 and 24. Note that in these two figures, the hand mechanism 2 includes two finger portions, namely the finger portions 21A and 21B, but may include further finger portions. The finger portions have identical configurations, similarly to the embodiments described above, and when the hand mechanism 2 is seen from above, as shown in FIG. 3, the finger portions 21 are disposed at equal angular intervals (i.e., 180 degree intervals) on a circumference centering on the longitudinal direction axis of the hand mechanism 2. Likewise in this embodiment, the rectangular parallelepiped-shaped object 10 is disposed on a floor surface, but a non-object 10' is disposed beside and in contact with the object 10. Moreover, an obstruction, not shown in the figures, exists on the sides (the front and rear sides in the figures) of the object 10, and therefore the object 10 cannot be moved in the corresponding direction. In this case, the determination unit 434 determines that the object 10 cannot be directly gripped. Note that this determination is made on the basis of the object information acquired by the object information acquisition unit 430.

In this embodiment, when the determination unit 434 determines that the object 10 cannot be directly gripped, shift gripping, which differs from direct gripping, is performed. Shift gripping is a gripping style performed after making the object 10 grippable by shifting the object 10 while pushing the object 10 against a different item in order to alter the position of the object 10. In other words, shift gripping, similarly to the tilt gripping described above, is a gripping style performed when the object 10 cannot be directly gripped, but differs from tilt gripping in that whereas in tilt gripping, a grippable state is formed by altering the attitude of the object 10, in shift gripping, a grippable state is formed by altering the position of the object 10. Likewise during shift gripping, a contactable portion is specified by contactable portion specification processing and an unexposed portion is specified by unexposed portion specification processing, whereupon shift gripping is realized by having the first operation control unit 436 and the second operation control unit 437 execute the first operation and the second operation, respectively, using the contactable portion and the unexposed portion.

First, in the contactable portion specification processing, the side face of the object 10 on the opposite side to the surface that contacts the non-object 10', which is a site, among the surfaces of the object 10 that are exposed so as to be contactable by the finger portions 21 of the hand mechanism 2, where an operation for pushing the object 10 against the non-object 10' in order to shift the object 10 upward (move the object 10 in the direction indicated by a black-outlined arrow in FIG. 23) can be performed, is selected as the contactable portion 101.

Further, when the object 10 is shifted upward in this manner, the side face of the object 10 that was in contact with the non-object 10', i.e. the side face that was not exposed and therefore not contactable by the finger portions 21 before the object 10 was shifted up, is exposed so as to become contactable. A finger portion 21 can therefore be brought into contact with the exposed side face, and as shown in FIG. 24, shift gripping can be implemented on the object 10 using this finger portion and the finger portion contacting the contactable portion 101. Hence, in the unexposed portion specification processing, the unexposed side face of the object 10 is selected as the unexposed portion 102. Note that at this time, the side face (the contactable portion 101) of the object 10 serves as the exposed surface that forms a pair with the unexposed portion so as to allow shift gripping to be performed on the object 10, or in other words the site that corresponds to the predetermined surface of the present invention.

Once the contactable portion 101 and the unexposed portion 102 have been specified in this manner, as the first operation, the first finger link portion 211A of the finger portion 21A is brought into contact with the contactable portion 101, whereupon the object 10 is shifted gradually upward in the direction indicated by the black-outlined arrow in FIG. 23 while being pushed toward the non-object 10' side. As a result, the position of the object 10 rises, and the unexposed portion 102 is exposed so as to become contactable by the first finger link portion 211B of the finger portion 21B. In FIG. 24, the part of the unexposed portion 102 that is exposed by the shift-up operation is denoted by the reference numeral "1020". Note that during the shift-up operation, the non-object 10' may be restrained by the finger portion 21B so as not to move. The object 10 is maintained in the shifted-up state. Next, as the second operation, the first finger link portion 211B of the finger portion 21B is brought into contact with the exposed part 1020 of the unexposed portion 102 of the object 10 in the shifted-up state. The first finger link portion 211B then clamps the object 10 together with the first finger link portion 211A of the finger portion 21A already contacting the contactable portion 101, whereby shift gripping is implemented on the object 10. Hence, likewise in this embodiment, the object 10 can be gripped without being affected, as far as is possible, by the conditions in which the object 10 is disposed. As a result, the object can be gripped with an extremely high degree of efficiency and moved after being gripped.

Note that shift gripping is not only a gripping style accompanied by an operation for shifting the gripping target upward, as shown in FIGS. 23 and 24, but also a gripping style accompanied by an operation for shifting the gripping target sideward (in a lateral direction of the gripping target). For example, when a plurality of objects are disposed in a piled-up state so that direct gripping thereof is impossible and the exposed site of the uppermost gripping target is substantially parallel with the bottom surface of the housing container, shift gripping can be realized by shifting the uppermost gripping target sideward and bringing finger portions of the hand mechanism into contact with a pair of side faces of the gripping target that are exposed by this shifting operation.

Fourth Embodiment

A gripping system according to a fourth embodiment will now be described on the basis of FIG. 25. FIG. 25 shows the object 10 disposed on a floor surface X0 from the side. Briefly, FIG. 25(a) shows the object 10 before being gripped, FIG. 25(b) shows the object 10 after being moved but before being gripped, FIG. 25(c) shows the object 10 after being rotated in a vertical direction (a height direction), and FIG. 25(d) shows the object 10 after being clamped in the vertical direction and gripped. Note that the floor surface X0 is provided with a wall surface X1 erected perpendicular thereto. In FIG. 25, the hand mechanism 2 includes two finger portions, namely the finger portion 21A and the finger portion 21B, but may include further finger portions. The finger portions have identical configurations, similarly to the embodiments described above, and when the hand mechanism 2 is seen from above, as shown in FIG. 3, the finger portions 21 are disposed at equal angular intervals (i.e., 180 degree intervals) on a circumference centering on the longitudinal direction axis of the hand mechanism 2. In this embodiment, the object 10 includes a projecting site 113 projecting outward from the side thereof, an upper side face 114 provided thereabove, and a lower side face 111 provided therebelow. Prior to being gripped, the object 10 is disposed on the floor surface X0, and a comparatively small interval R2 is formed between the object and the wall surface X1. In this embodiment, however, the interval R2 is not large enough to be able to insert a finger portion (the finger portion 21B, for example) of the hand mechanism 2 in order to directly grip the object 10 (note that in FIG. 25(a), the interval R2 is enlarged to facilitate understanding of the disposal state of the object 10). Further, an obstruction, not shown in the figures, exists on the sides (the front and rear sides in the figures) of the object 10, and therefore the object 10 cannot be moved in the corresponding direction. In this case, the determination unit 434 determines that the object 10 cannot be directly gripped. Note that this determination is made on the basis of the object information acquired by the object information acquisition unit 430.

In this embodiment, when the determination unit 434 determines that the object 10 cannot be directly gripped, rotation gripping, which differs from direct gripping, is performed. Rotation gripping is a gripping style performed after making the object 10 grippable by rotating the object 10 in order to alter the attitude thereof while keeping a part of the object 10 in contact with a different item thereto (in this embodiment, the wall surface X1). In other words, rotation gripping, similarly to the tilt gripping described above, is a gripping style performed when the object 10 cannot be directly gripped, in which a grippable state is formed by altering the attitude of the object 10. Likewise during rotation gripping, a contactable portion is specified by contactable portion specification processing and an unexposed portion is specified by unexposed portion specification processing, whereupon rotation gripping is realized by having the first operation control unit 436 and the second operation control unit 437 execute the first operation and the second operation, respectively, using the contactable portion and the unexposed portion.

Note that in this embodiment, as shown in FIG. 25(a), prior to gripping, the interval R2 exists between the object 10 and the wall surface X1. Accordingly, to enable rotation gripping of the object 10, the hand mechanism 2 moves the object 10 toward the wall surface X1 by pushing the object 10 before implementing rotation gripping thereon so that the object 10 contacts the wall surface X1. This movement of the object 10 prior to rotation gripping is realized by a function unit, not shown in the figures, formed in the hand control device 43, and this function unit corresponds to a position adjustment unit of the present invention.

Here, in the contactable portion specification processing, the lower side face 111 of the object 10, which is a site, among the surfaces of the object 10 that are exposed so as to be contactable by the finger portions 21 of the hand mechanism 2, where an operation for exerting force on the object 10 so as to rotate the object 10 in a vertical direction (a height direction) (rotate the object 10 in a direction indicated by a black-outlined arrow in FIG. 25(c)) can be performed, is selected as the contactable portion 101.

Further, when the object 10 is rotated in the vertical direction in this manner, the bottom surface (the surface contacting the floor surface X0) of the object 10, i.e., a bottom surface 112 that is not exposed and therefore not contactable by the finger portions 21 prior to rotation, is exposed so as to become contactable. Hence, by bringing a finger portion 21 into contact with the exposed bottom surface 112 and bringing another finger portion 21 into contact with an upper surface 115 of the object 10, rotation gripping can be implemented on the object 10 by the two finger portions, as shown in FIG. 25(d). Accordingly, in the unexposed portion specification processing, the bottom surface 112 of the object 10 is selected as the unexposed portion 102. Note that at this time, the exposed site that forms a pair with the unexposed portion so as to enable rotation gripping of the object 10, or in other words the site that corresponds to the predetermined surface of the present invention, is the upper surface 115 of the object 10.

Once the contactable portion 101 and the unexposed portion 102 have been specified in the manner described above, and the object 10 has been moved by the position adjustment unit so as to contact the wall surface X1, the first operation control unit 436, as the first operation, brings the first finger link portion 211A of the finger portion 21A into contact with the contactable portion 101, and then rotates the object 10 in the direction indicated by the black-outlined arrow in FIG. 25(c) while keeping the object 10 in contact with the wall surface X1. As a result, the bottom surface 112 of the object 10 is lifted up while a part of the bottom surface 112 remains in contact with the floor surface X0, whereby the unexposed portion 102 (the bottom surface 112) is exposed so as to become contactable by the first finger link portion 211A of the finger portion 21A. The object 10 is maintained in this lifted-up state. Once the unexposed portion 102 has been exposed by the rotation operation described above, the second operation control unit 437, as the second operation, brings the first finger link portion 211B of the finger portion 21B into contact with the upper surface 115 and brings the first finger link portion 211A of the finger portion 21A performing the lifting-up operation into contact with the unexposed portion 102 by sliding the first finger link portion 211A into a space formed between the underside of the unexposed portion 102 and the floor surface X0. The object 10 is then clamped and subjected to rotation gripping by the first finger link portion 211B of the finger portion 21B contacting the upper surface 115 and the first finger link portion 211A of the finger portion 21A contacting the unexposed portion 102.

Hence, likewise in this embodiment, the object 10 can be gripped without being affected, as far as is possible, by the conditions in which the object 10 is disposed. As a result, the object can be gripped with an extremely high degree of efficiency and moved after being gripped. Further, by moving the object 10 prior to rotation gripping so as to form a condition in which rotation gripping can be performed easily, or more specifically, a condition in which the projecting site 113 of the object 10 contacts the wall surface X1, the object 10 can be gripped more smoothly. Moreover, in the series of actions performed prior to rotation gripping to move the object 10 to the wall surface X1 and then rotate the object 10, the first finger link portion 211A of the finger portion 21A is kept in contact with the lower side face 111 serving as the contactable portion 101 of the object 10. Therefore, operations between movement and rotation of the object 10 can be executed more smoothly.

Modified Examples

In the rotation gripping according to the fourth embodiment, described above, the object 10 is set in a grippable state by rotating the object 10 in the vertical direction (the height direction) so as to expose the unexposed portion 102. In other words, the object 10 is set in a grippable state by rotating the object 10 about an axis extending in the width direction of the object 10 so as to expose the unexposed portion 102. However, the rotation direction of the object 10 is not limited to the vertical direction. For example, as long as the unexposed portion is exposed by rotating the object 10, the object 10 may be rotated in the lateral direction thereof. Alternatively, the object 10 may be rotated in an oblique direction between the vertical direction and the lateral direction. Note that here, the term "rotation in the lateral direction" includes rotating the object 10 about an axis extending in a depth direction of the object. 10 and rotating the object 10 about an axis extending in the height direction of the object 10.

Further, moving the object 10 (moving the object 10 using the position adjustment unit) before the object 10 is gripped, as described in the fourth embodiment, may be applied to the first to third embodiments, described above. For example, when the interval R1 exists between the object 10 and the non-object 10', as described in the second embodiment, the object 10 may be moved to the non-object 10' side so as to eliminate the interval R1, whereupon the shift gripping described in the third embodiment may be performed. Needless to mention, the tilt gripping described in the first and second embodiments may also be performed after moving the object 10 to the non-object 10' side.

Fifth Embodiment

A gripping system according to a fifth embodiment will now be described on the basis of FIG. 26. FIG. 26 shows the object 10 disposed on a floor surface from the side. Briefly, FIG. 26(a) shows the object 10 before being gripped, FIG. 26(b) shows the object 10 after a part thereof is suspended from the floor surface, and FIG. 26(c) shows the object 10 after being clamped and gripped in a vertical direction (an up-down direction). Further, in FIG. 26, the hand mechanism 2 includes three finger portions, namely the finger portion 21A, the finger portion 21B, and the finger portion 21C. The finger portions have identical configurations, similarly to the embodiments described above, and when the hand mechanism 2 is seen from above, as shown in FIG. 3, the finger portions 21 are disposed at equal angular intervals (i.e., 120 degree intervals) on a circumference centering on the longitudinal direction axis of the hand mechanism 2. Note that the object 10 shown in FIG. 26, similarly to the object shown in FIG. 25, includes the projecting site 113 projecting outward from the side thereof, the upper side face 114 provided thereabove, and the lower side face 111 provided therebelow. Furthermore, the length and width of the object 10 shown in FIG. 26 are set to be larger than an interval formed when two of the three finger portions 21A to 21C are opened to a maximum extent toward a radial direction outer side of the hand mechanism 2. In other words, the length and width of the object 10 are set to be larger than a length and a width that can be gripped by the hand mechanism 2. In this case, the determination unit 434 determines that the object 10 cannot be directly gripped. Note that this determination is made on the basis of the object information acquired by the object information acquisition unit 430.

In this embodiment, when the determination unit 434 determines that the object 10 cannot be directly gripped, suspension gripping, which differs from direct gripping, is performed. Suspension gripping is a gripping style performed after setting the object in a grippable state by suspending a part of the object 10 from the floor surface so as to alter the attitude of the object 10. In other words, suspension gripping, similarly to the tilt gripping and rotation gripping described above, is a gripping style performed when the object 10 cannot be directly gripped, in which a grippable state is formed by altering the attitude of the object 10. Likewise in suspension gripping, a contactable portion is specified by contactable portion specification processing and an unexposed portion is specified by unexposed portion specification processing, whereupon suspension gripping is realized by having the first operation control unit 436 and the second operation control unit 437 execute the first operation and the second operation, respectively, using the contactable portion and the unexposed portion.

In the contactable portion specification processing according to this embodiment, the lower side face 111 of the object 10, which is a surface, among the surfaces of the object 10, that is exposed and is therefore contactable by the finger portions 21 of the hand mechanism 2 and serves as a site where an operation for exerting force on the object 10 so as to suspend a part of the object 10 from the floor surface can be performed, is selected as the contactable portion 101.

Further, when a part of the object 10 is suspended from the floor surface, the bottom surface (the surface contacting the floor surface) of the object 10, i.e., the bottom surface 112 that is not exposed and therefore not contactable by the finger portions 21 prior to suspension, is exposed so as to become contactable. Hence, by bringing a finger portion 21 into contact with the exposed bottom surface 112 and bringing another finger portion 21 into contact with the upper surface 115 of the object 10, suspension gripping can be implemented on the object 10. Accordingly, in the unexposed portion specification processing, the bottom surface 112 of the object 10 is selected as the unexposed portion 102. Note that at this time, the exposed site that forms a pair with the unexposed portion so as to enable suspension gripping of the object 10, or in other words the site that corresponds to the predetermined surface of the present invention, is the upper surface 115 of the object 10.

Once the contactable portion 101 and the unexposed portion 102 have been specified in this manner, as the first operation, the first operation control unit 436 causes the first finger link portion 211A of the finger portion 21A (the first finger portion) to contact the lower side face 111 serving as the contactable portion 101 and, while contacting the lower side face 111, lift up a site of the object 10 on the contactable portion 101 side (a site on the right side in FIG. 26). Thus, the site of the object 10 on the contactable portion 101 side is suspended from the floor surface while a site of the object 10 on the opposite side to the contactable portion 101 remains in contact with the floor surface, and as a result, the bottom surface 112 serving as the unexposed portion 102 is exposed so as to be subsequently contactable by the first finger link portion 211B of the finger portion 21B (FIG. 26(*b*)).

Once the bottom surface 112 serving as the unexposed portion 102 of the object 10 has been exposed by the suspension operation described above, next, as the second operation, the second operation control unit 437 brings the first finger link portion 211B of the finger portion 21B (the second finger portion) into contact with the bottom surface 112 of the object 10 by inserting the first finger link portion 211B between the bottom surface 112 and the floor surface. The second operation control unit 437 then brings the first finger link portion 211C of the finger portion 21C (the third finger portion) other than the finger portion 21A (the first finger portion) and the finger portion 21B (the second finger portion) into contact with the upper surface 115 (the predetermined surface) of the object 10, whereupon the object 10 is clamped and subjected to suspension gripping by the first finger link portion 211B of the finger portion 21B contacting the bottom surface 112 serving as the unexposed portion 102 of the object 10 and the first finger link portion 211C of the finger portion 21C contacting the upper surface 115 serving as the predetermined surface of the object 10 (FIG. 26(*c*)).

Hence, according to this embodiment, even when the length and width of the object 10 are larger than the length and width that can be gripped by the hand mechanism 2, the object 10 can be gripped without being affected, as far as is possible, by the conditions in which the object 10 is disposed, the dimensions of the object 10, and so on. As a result, the object can be gripped with an extremely high degree of efficiency and moved with stability after being gripped.

First Modified Example

In the example described above in the fifth embodiment, a site near the lower side face 111 (the contactable portion 101) in the length direction of the object 10 is gripped, but a site removed from the lower side face 111 (the contactable portion 101) in the length direction of the object 10 (in other words, a site further closer the center in the length direction of the object 10) may be gripped instead. FIG. 27 is a view illustrating procedures for executing suspension gripping in a case where a site near the center in the length direction of the object 10 is gripped. FIG. 27(*a*) shows the object 10 after a part thereof is suspended from the floor surface, FIG. 27(*b*) shows a state in which the object 10 is supported in an attitude where the unexposed portion 102 (the bottom surface 112) is exposed, and FIG. 27(*c*) shows the object 10 after being clamped and gripped in the vertical direction (the up-down direction).

In this modified example, similarly to the fifth embodiment, the first operation performed after specifying the contactable portion 101 and the unexposed portion 102 of the object 10 is an operation for lifting up a site of the object 10 on the contactable portion 101 side (a site on the right side in FIG. 26) while causing the first finger link portion 211A of the finger portion 21A (the first finger portion) to contact the lower side face 111 serving as the contactable portion 101. Thus, the site of the object 10 on the contactable portion 101 side is suspended from the floor surface while the site of the object 10 on the opposite side to the contactable portion 101 remains in contact with the floor surface, and as a result, the bottom surface 112 serving as the unexposed portion 102 is exposed so as to be subsequently contactable by the first finger link portion 211B of the finger portion 21B (FIG. 27(*a*)).

Once the bottom surface 112 serving as the unexposed portion 102 of the object 10 has been exposed by the suspension operation described above, next, as the second operation, the second operation control unit 437 first brings the first finger link portion 211B of the finger portion 21B (the second finger portion) into contact with the bottom surface 112 by inserting the first finger link portion 211B between the bottom surface 112 of the object 10 and the floor surface, thereby supporting the object 10 in an attitude where the bottom surface 112 is exposed. Next, the second operation control unit 437 brings the first finger link portion 211A of the finger portion 21A (the first finger portion) that executed the suspension operation on the object 10 into contact with the bottom surface 112 of the object 10 by sliding the first finger link portion 211A into the space formed between the bottom surface 112 of the object 10 and the floor surface. It is assumed that at this time, the hand mechanism 2 is controlled so that a contact position between the first finger link portion 211A of the finger portion 21A (the first finger portion) and the bottom surface 112 of the object 10 is set in a deeper position (a position on the left side in FIG. 27, i.e., a position further closer to the center in the length direction of the object 10) than a contact position between the first finger link portion 211B of the finger portion 21B (the second finger portion) and the bottom surface 112 of the object 10. The second operation control unit 437 then brings the first finger link portion 211C of the finger portion 21C (the third finger portion) other than the finger portion 21A (the first finger portion) and the finger portion 21B (the second finger portion) into contact with the upper surface 115 (the predetermined surface) of the object 10, whereupon the object 10 is clamped and subjected to suspension gripping by the first finger link portions 211A and 211B of the finger portions 21A and 21B contacting the bottom surface 112 serving as the unexposed portion 102 of the object 10 and the first finger link portion 211C of the finger portion 21C contacting the upper surface 115 serving as the predetermined surface of the object 10 (FIG. 27(c)).

Hence, according to this modified example, the object 10 can be gripped while causing the finger portion 21A to contact a site further closer to the center in the length direction of the object 10, and therefore, even in cases where the object 10 is comparatively heavy, the object 10 is comparatively long, and so on, the object 10 can be gripped more reliably and the attitude of the object can be kept more stable after gripping. As a result, the object can be gripped with an extremely high degree of efficiency and moved with stability after being gripped.

Second Modified Example

In the examples described above in the fifth embodiment and the first modified example, the object 10 is subjected to suspension gripping using the hand mechanism 2 having three finger portions 21, but suspension gripping may also be performed on the object 10 using a hand mechanism 2 having four finger portions 21. FIG. 28 is a view illustrating suspension gripping of the object 10 using a hand mechanism 2 having four finger portions 21A to 21D. FIG. 28(a) shows the object 10 after a part thereof has been suspended from the floor surface, FIG. 28(b) shows a state in which the object 10 is supported in an attitude where the unexposed portion 102 (the bottom surface 112) is exposed, and FIG. 28(c) shows the object 10 after being clamped and gripped in the vertical direction (the up-down direction). Further, in the hand mechanism 2 shown in FIG. 28, the four finger portions 21A to 21D have identical configurations, similarly to the embodiments described above, and when the hand mechanism 2 is seen from above, as shown in FIG. 3, the finger portions 21 are disposed at equal angular intervals (i.e., 90 degree intervals) on a circumference centering on the longitudinal direction axis of the hand mechanism 2.

In this modified example, similarly to the fifth embodiment and the first modified example, the first operation performed after specifying the contactable portion 101 and the unexposed portion 102 of the object 10 is an operation for lifting up a site of the object 10 on the contactable portion 101 side (a site on the right side in FIG. 28) while causing the first finger link portion 211A of the finger portion 21A (the first finger portion) to contact the lower side face 111 serving as the contactable portion 101. Thus, the site of the object 10 on the contactable portion 101 side is suspended from the floor surface while the site of the object 10 on the opposite side to the contactable portion 101 remains in contact with the floor surface, and as a result, the bottom surface 112 serving as the unexposed portion 102 is exposed so as to be subsequently contactable by the first finger link portion 211B of the finger portion 21B (the second finger portion) (FIG. 28(a)). When the bottom surface 112 serving as the unexposed portion 102 of the object 10 is exposed by the suspension operation in this manner, similarly to the fifth embodiment and first modified example described above, as the second operation, the second operation control unit 437 first brings the first finger link portion 211B of the finger portion 21B (the second finger portion) into contact with the bottom surface 112 of the object 10 by inserting the first finger link portion 211B between the bottom surface 112 and the floor surface (FIG. 28(b)). Next, the second operation control unit 437 brings the first finger link portion 211D of the finger portion 21D (the fourth finger portion) constituting one of the finger portions other than the finger portion 21A (the first finger portion) and the finger portion 21B (the second finger portion) into contact with the bottom surface 112 of the object 10 by sliding the first finger link portion 211D into the space formed between the bottom surface 112 of the object 10 and the floor surface while maintaining the contact state between the first finger link portion 211A of the finger portion 21A (the first finger portion) and the lower side face 111 and the contact state between the first finger link portion 211B of the finger portion 21B (the second finger portion) and the bottom surface 112. It is assumed that at this time, the hand mechanism 2 is controlled so that a contact position between the first finger link portion 211D of the finger portion 21D (the fourth finger portion) and the bottom surface 112 of the object 10 is set in a deeper position (a position on the left side in FIG. 28, i.e., a position further closer to the center in the length direction of the object 10) than a contact position between the first finger link portion 211B of the finger portion 21B (the second finger portion) and the bottom surface 112 of the object 10. The second operation control unit 437 then brings the first finger link portion 211C of the finger portion 21C (the third finger portion), which is a finger portion other than the finger portion 21A (the first finger portion) and the finger portion 21B (the second finger portion), into contact with the upper surface 115 (the predetermined surface) of the object 10, whereupon the object 10 is clamped and subjected to suspension gripping by the first finger link portions 211B and 211D of the finger portions 21B and 21D contacting the bottom surface 112 serving as the unexposed portion 102 of the object 10 and the first finger link portion 211C of the finger portion 21C contacting the upper surface 115 serving as the predetermined surface of the object 10 (FIG. 28(c)). Note that at this time, by moving the first finger link portion 211A of the finger portion 21A (the first finger portion) from the lower side face 111 to the bottom surface 112 or the upper surface 115, the object 10 may be gripped while being clamped by the four finger portions.

Hence, according to this modified example, similarly to the first modified example described above, the object 10 can be gripped while causing the finger portion 21D to contact a site further closer to the center in the length direction of the object 10, and therefore, even in cases where the object 10 is comparatively heavy, the object 10 is comparatively long, and so on, the object 10 can be gripped more reliably and the attitude of the object can be kept more stable after gripping. As a result, the object can be gripped with an extremely high degree of efficiency and moved with stability after being gripped.

Sixth Embodiment

A gripping system according to a sixth embodiment will now be described on the basis of FIG. 29. FIG. 29 shows the object 10 disposed on a floor surface from the side. Briefly, FIG. 29(a) shows the object 10 before being gripped, and FIG. 29(b) shows the object 10 after being clamped and gripped in a lateral direction (a left-right direction in FIG. 29(b)). Further, in FIG. 29, the hand mechanism 2 includes at least two finger portions, namely the finger portion 21A and the finger portion 21B. The finger portions have identical configurations, similarly to the embodiments described above, and when the hand mechanism 2 is seen from above, as shown in FIG. 3, the finger portions 21 are disposed at equal angular intervals (i.e., 180 degree intervals) on a circumference centering on the longitudinal direction axis of the hand mechanism 2. Note that the object 10 shown in FIG. 29 includes a collar portion 115 projecting outward from the side thereof, the upper side face 114 provided thereabove, and the lower side face 111 provided therebelow. Prior to being gripped, the object 10 is disposed on the floor surface X0, and either the collar portion 115 on a back surface side of the object 10 contacts the wall surface X1 or an interval that is too small to insert a finger portion 21 is formed between the collar portion 115 and the wall surface X1. Note that even when the collar portion 115 on the back surface side of the object 10 and the wall surface X1 contact or are close to each other, an interval is formed between the wall surface X1 and the upper side face 114 positioned on the back surface side of the object 10, and therefore the upper side face 114 on the back surface side and the upper side face 114 on a front surface side could conceivably be clamped and gripped by the two finger portions 21A and 21B of the hand mechanism 2 in the lateral direction. Due to the small height direction dimension of the upper side face 114, however, the object 10 cannot easily be gripped with stability when the upper side face 114 is clamped in the lateral direction. Moreover, an obstruction, not shown in the figures, exists on the sides (the front and rear sides in the figures) of the object 10, and therefore the object 10 cannot be clamped and gripped by the two finger portions 21A and 21B of the hand mechanism 2 in the lateral direction from this direction. In this case, the determination unit 434 determines that the object 10 cannot be directly gripped. Note that this determination is made on the basis of the object information acquired by the object information acquisition unit 430.

In this embodiment, when the determination unit 434 determines that the object 10 cannot be directly gripped, horizontal shift gripping, which differs from direct gripping, is performed. Horizontal shift gripping is a gripping style performed after setting the collar portion 115 positioned on the back surface side of the object 10 and the collar portion 115 positioned on the front surface side of the object 10 in a state enabling lateral direction gripping thereof by the two finger portions 21A and 21B of the hand mechanism 2 by shifting the object parallel to the floor surface X0 in a direction for separating the collar portion 115 of the object 10 from the wall surface X1 (i.e., moving the object 10 horizontally in the direction of a black-outlined arrow in FIG. 29(a)) so as to alter the position thereof. In other words, horizontal shift gripping, similarly to the tilt gripping and rotation gripping described above, is a gripping style performed when the object 10 cannot be directly gripped, in which a grippable state is formed by altering the position of the object 10. Likewise during horizontal shift gripping, a contactable portion is specified by contactable portion specification processing and an unexposed portion is specified by unexposed portion specification processing, whereupon rotation gripping is realized by having the first operation control unit 436 and the second operation control unit 437 execute the first operation and the second operation, respectively, using the contactable portion and the unexposed portion.

In the contactable portion specification processing according to this embodiment, the upper side face 114 positioned on the back surface side of the object 10, which is a surface, among the surfaces of the object 10, that is exposed and is therefore contactable by the finger portions 21 of the hand mechanism 2 and a site where an operation for exerting force on the object 10 so as to shift the object 10 parallel to the floor surface X0 in a direction for separating the collar portion 115 positioned on the back surface side of the object 10 from the wall surface X1 can be performed, is selected as the contactable portion 101.

Further, when the object 10 is shifted parallel to the floor surface X0 in the direction for separating the collar portion 115 positioned on the back surface side of the object 10 from the wall surface X1, the collar portion 115, which constitutes a surface positioned on the back surface side of the object 10 and was not exposed and therefore not contactable by the finger portions 21 before the object 10 was shifted in the lateral direction, is exposed so as to become contactable by the finger portions 21 of the hand mechanism 2. Thus, a finger portion 21 can be brought into contact with the exposed collar portion 115, and by bringing another finger portion 21 into contact with the collar portion 115 positioned on the front surface side of the object 10, the object 10 can be gripped in the lateral direction. Hence, in the unexposed portion specification processing, the collar portion 115 positioned on the back surface side of the object 10 is selected as the unexposed portion 102. Note that at this time, the exposed site that forms a pair with the unexposed portion so as to enable lateral direction gripping of the object 10, or in other words the site that corresponds to the predetermined surface of the present invention, is the collar portion 115 positioned on the front surface side of the object 10.

Once the contactable portion 101 and the unexposed portion 102 have been specified in this manner, as the first operation, the first operation control, unit 436 shifts the object 10 in the direction (a rightward direction) indicated by a black-outlined arrow in FIG. 26(a) while causing the first finger link portion 211A of the finger portion 21A (the first finger portion) to contact the contactable portion 101 (the upper side face 114 positioned on the back surface side of the object 10). An interval into which a finger portion 21 can be inserted is thus formed between the collar portion 115 positioned on the back surface side of the object 10 and the wall surface X1, with the result that the unexposed portion 102 (the collar portion 115 positioned on the back surface side of the object 10) is exposed so as to be subsequently contactable by the first finger link portion 211A of the finger portion 21A (FIG. 29(b)).

Once the unexposed portion 102 of the object 10 has been exposed by the horizontal shifting operation described above, next, as the second operation, the second operation control unit 437 brings the first finger link portion 211A of the finger portion 21A (the first finger portion) into contact with the collar portion 115 positioned on the back surface side of the object 10 by inserting the first finger link portion 211A between the collar portion 115 positioned on the back surface side of the object 10 and the wall surface X1, and brings the first finger link portion 211B of the finger portion 21B (the second finger portion) into contact with the collar portion 115 positioned on the front surface side of the object 10, whereupon the object 10 is clamped and gripped in a lateral direction by the first finger link portion 211A contacting the collar portion 115 on the back surface side, which serves as the unexposed portion 102 of the object 10, and the first finger link portion 211B contacting the collar portion 115 on the front surface side, which serves as the predetermined surface of the object 10 (FIG. 29(b)).

Hence, according to this embodiment, the object 10 can be gripped without being affected, as far as is possible, by the conditions in which the object 10 is disposed and the shape of the object 10. As a result, the object can be gripped with an extremely high degree of efficiency and moved after being gripped.

<Modified examples>

A first modified example of the hand mechanism 2 provided in the above gripping system will be described on the basis of FIGS. 30 to 32. In the example described above in the sixth embodiment, the object 10 that has the collar portion 115 formed on the side face of the object 10 and is disposed such that the collar portion 115 positioned on the back surface side of the object 10 contacts the wall surface X1 is subjected to horizontal shift gripping. However, as shown in FIG. 30, horizontal shift gripping can also be applied in a case where a plurality of rectangular parallelepiped-shaped items are arranged in a row in a lateral direction and an item (the object 10) having other items (non-objects 10') disposed on either side thereof serves as the gripping subject. More specifically, by shifting the object 10 horizontally toward a front side (in die direction indicated by a black-outlined arrow in FIG. 30) While causing the first finger link portion 211A of the finger portion 21A to contact the upper surface serving as the contactable portion 101 of the object 10, the back surface serving as the unexposed portion 102 can be exposed, whereupon the back surface and the front surface can be clamped and gripped in the lateral direction by the two finger portions 21A and 21B of the hand mechanism 2. Further, when the two side faces of the object 10 shown in FIG. 30 are selected as the unexposed portion 102, the two side faces serving as the unexposed portion 102 can be exposed by shifting the object 10 horizontally toward the front side (in the direction indicated by a black-outlined arrow in FIG. 30) while causing the first finger link portion 211A of the finger portion 21A to contact the upper surface serving as the contactable portion 101 of the object 10, whereupon the two side faces can be clamped and gripped in the lateral direction by the two finger portions 21A and 21B of the hand mechanism 2.

Note that when the object 10 is shifted in a horizontal direction while causing the first finger link portion 211A of the finger portion 21A to contact the upper surface serving as the contactable portion 101 of the object 10, the first finger link portion 211B of the finger portion 21B other than the finger portion 21A may also be brought into contact with a front surface 103 positioned on the shifting direction side of the object 10, as shown in FIG. 31. When the object 10 is shifted in a horizontal direction in this manner, the object 10 can be shifted in a horizontal direction while preventing the object 10 from falling over onto the front surface side thereof, even when irregularities exist to a certain extent on the floor surface X0 or the like. As a result, variation in the attitude of the object 10 while the object 10 is shifted in a horizontal direction can be suppressed. Note that to prevent the object 10 from falling over onto the front surface side thereof even more reliably, the position on the front surface 103 of the object 10 with which the first finger link portion 211B of the finger portion 21B is brought into contact may be set as a position nearer the upper surface than the bottom surface in the height direction of the object 10.

Furthermore, when an object 10 having a bottom surface with a comparatively large surface area is shifted horizontally, the object 10 may be shifted in a horizontal direction in a state where a shifting direction-side site on the bottom surface of the object 10 is suspended from the floor surface X0, as shown in FIG. 32. More specifically, first, as shown in FIG. 32(*a*), the object 10 is tilted toward the back surface side by pushing up a site on the front surface 103 of the object 10 near the upper surface in a direction (diagonally upward and to the left) indicated by a black-outlined arrow A2 in FIG. 32(*a*) using the first finger link portion 211B of the finger portion 21B while pushing in a site on the upper surface of the object 10 near the back surface in a direction (diagonally downward and to the left) indicated by a black-outlined arrow A1 in FIG. 32(*a*) using the first finger link portion 211A of the finger portion 21A. In so doing, a shifting direction-side site (a site near the front surface 103) on the bottom surface of the object 10 can be suspended from the floor surface X0. Next, as shown in FIG. 32(*b*), the object 10 may be shifted in a horizontal direction while keeping the shifting direction-side site on the bottom surface of the object 10 suspended from the floor surface X0 by altering the direction in which the first finger link portion 211A of the finger portion 21A pushes the site on the upper surface of the object 10 near the back surface to a direction (a downward direction) indicated by a black-outlined arrow A3 in FIG. 32(*b*) while keeping the direction in which the first finger link portion 211B of the finger portion 21B pushes the site on the front surface of the object 10 near the upper surface as a diagonally leftward and upward direction, thereby moving the hand mechanism 2 in a horizontal direction (a direction indicated by a black-outlined arrow A4 in FIG. 32(*b*)). When the object 10 is shifted in a horizontal direction in this manner, the surface area of the part of the bottom surface of the object 10 that contacts the floor surface X0 decreases, and as a result, frictional force between the object 10 and the floor surface X0 can be reduced even when an object 10 having a bottom surface with a comparatively large surface area is shifted in a horizontal direction.

Note that in the examples described in the above embodiments and modified examples, a single surface of an object having a polygonal shape is selected as the contactable portion or the unexposed portion according to the present invention, but the contactable portion or the unexposed portion is not limited to a surface of the object. For example, the contactable portion may be any site, such as a corner portion or an edge portion of the object, in which the attitude or position of the object can be altered. Further, the unexposed portion may be any site, such as a corner portion or an edge portion of the object, that is exposed when the attitude or position of the object is altered, with the result that the object can be gripped by bringing finger portions of the hand mechanism into contact with the site and a predetermined surface.

REFERENCE SIGNS LIST

1 Robot arm
2 Hand mechanism
20 Base portion
21 Finger portion
22 First joint portion
23 Second joint portion
211 First finger link portion
212 Second finger link portion
213 Base end portion
3 Arm mechanism
30*a* First joint portion
30*b* Second joint portion
30*c* Third joint portion
30*d* Fourth joint portion
30*e* Fifth joint portion
30*f* Sixth joint portion
31 First arm link portion
32 Second arm link portion
33 Third arm link portion 34 Fourth arm link portion
35 Fifth arm link portion
36 Connecting member
4 Support portion
42 Arm control device
43 Hand control device
51 First motor
52 Second motor
53 Third motor
61, 62 Bevel gear
63 Worm wheel
64 Worm
65, 66 Gear
70 Pressure sensor
10 Object
10' Non-object
101 Contactable portion
102 Unexposed portion

The invention claimed is:

1. A gripping system for gripping an object using a hand mechanism having at least two finger portions, comprising:
a memory storing a program; and
one or more processors connected to the memory, the one or more processors executing the program to:
determine whether or not a predetermined gripping portion, with which the at least two finger portions of the hand mechanism are brought into contact when the object is to be gripped, is exposed;
specify a contactable portion and an unexposed portion of the object when the predetermined gripping portion is determined to be not exposed, the contactable portion being a portion of the object that is contactable by a first finger portion constituting at least one of the at least two finger portions and the unexposed portion being a portion of the object that is not exposed at a time of the determination and therefore not contactable by either the first finger portion or a second finger portion that differs from the first finger portion;
control the hand mechanism to expose the unexposed portion so that the first finger portion or the second finger portion becomes contactable with the unexposed portion that has been exposed by altering a position or an attitude of the object while causing the first finger portion to contact the contactable portion; and
control the hand mechanism to grip the object in a state where the unexposed portion has been exposed by bringing the first finger portion or the second finger portion into contact with the unexposed portion that has been exposed and bringing a finger portion other than the finger portion contacting the unexposed portion that has been exposed into contact with a predetermined surface of the object other than the unexposed portion that has been exposed.

2. The gripping system according to claim 1,
wherein a third finger portion other than the first finger portion or the second finger portion contacting the unexposed portion that has been exposed differs from the first finger portion and the second finger portion, and
wherein the one or more processors execute the program to control the hand mechanism to:
expose the unexposed portion by tilting the object in a predetermined direction so that a bottom surface of the object remains partially in contact with a floor surface while causing the first finger portion to contact the contactable portion; and
grip the object by the unexposed portion that has been exposed and the predetermined surface using the second finger portion and the third finger portion, respectively.

3. The gripping system according to claim 1,
wherein the second finger portion is contacting the unexposed portion that has been exposed, and
wherein the one or more processors execute the program to control the hand mechanism to:
expose the unexposed portion which is a predetermined back surface of the object, which is in contact with an other item that differs from the object, by bringing the first finger portion into contact with the contactable portion and, while the first finger portion contacts the contactable portion, shifting the object while pushing the object against the other item; and
grip the object by the predetermined back surface and the unexposed portion that has been exposed using the first finger portion and the second finger portion, respectively.

4. The gripping system according to claim 1,
wherein a third finger portion other than the first finger portion or the second finger portion contacting the unexposed portion that has been exposed differs from the first finger portion and the second finger portion, and
wherein the one or more processors execute the program to control the hand mechanism to:
expose the unexposed portion by bringing the first finger portion into contact with the contactable portion and rotating the object in a predetermined rotation direction so that a contact surface by which the object contacts an other item other than the object remains in contact with the other item; and
grip the object by the unexposed portion that has been exposed and the predetermined surface using the second finger portion and the third finger portion, respectively.

5. The gripping system according to claim 4, wherein the predetermined rotation direction is a direction for rotating the object in a vertical direction or a direction for rotating the object in a lateral direction.

6. The gripping system according to claim 1, wherein the one or more processors execute the program to control the hand mechanism to:
when the predetermined gripping portion is determined to be not exposed, move the object toward an other item positioned away from the object by pushing the contactable portion using the first finger portion until the object comes into contact with the other item; and
expose the unexposed portion after the object is brought into contact with the other item by altering the position or the attitude of the object while pushing the object against the other item.

7. The gripping system according to claim 6, wherein the one or more processors execute the program to control the hand mechanism to alter the position or the attitude of the object while maintaining a state in which the first finger portion contacts the contactable portion.

8. The gripping system according to claim 1,
wherein a third finger portion other than the first finger portion or the second finger portion contacting the unexposed portion that has been exposed differs from the first finger portion and the second finger portion, and wherein the one or more processors execute the program to control the hand mechanism to:

expose the unexposed portion which is a bottom surface of the object, the bottom surface contacting a floor surface, by lifting up a contactable side site of the object while causing the first finger portion to contact the contactable portion; and grip the object by the bottom surface and the predetermined surface using the second finger portion and the third finger portion, respectively.

9. The gripping system according to claim 1, wherein a third finger portion other than the first finger portion or the second finger portion contacting the unexposed portion that has been exposed differs from the first finger portion and the second finger portion, and wherein the one or more processors execute the program to control the hand mechanism to:

expose the unexposed portion which is a bottom surface of the object, the bottom surface contacting a floor surface, by lifting up a contactable side site of the object while causing the first finger portion to contact the contactable portion; and grip the object by the bottom surface and the predetermined surface using the first and second finger portions and the third finger portion, respectively, by bringing the second finger portion into contact with the bottom surface of the object so that the bottom surface of the object is exposed, and in this state, inserting the first finger portion deeper than a position in which the second finger portion contacts the bottom surface of the object.

10. The gripping system according to claim 1, wherein wherein a third finger portion and a fourth finger portion other than the first finger portion or the second finger portion contacting the unexposed portion that has been exposed differ from the first finger portion and the second finger portion, and wherein the one or more processors execute the program to control the hand mechanism to:

expose the unexposed portion which is a bottom surface of the object, the bottom surface contacting a floor surface, by lifting up a contactable side site of the object while causing the first finger portion to contact the contactable portion; and grip the object by the bottom surface and the predetermined surface using the fourth and second finger portions and the third finger portion, respectively, by bringing the second finger portion into contact with the bottom surface of the object so that the bottom surface of the object is exposed, and in this state, inserting the fourth finger portion deeper than a position in which the second finger portion contacts the bottom surface of the object.

11. The gripping system according to claim 1, wherein the first finger portion is contacting the unexposed portion that has been exposed, and wherein the one or more processors execute the program to control the hand mechanism to:

expose the unexposed portion which is a contact surface by which the object contacts an item other than the object by shifting the object parallel to a floor surface in a direction for separating the object from the other item contacted by the object while causing the first finger portion to contact the contactable portion, and grip the object by the unexposed portion that has been exposed and the predetermined surface using the first finger portion and the second finger portion, respectively.

* * * * *